United States Patent [19]

Aoyama

[11] Patent Number: 5,291,645
[45] Date of Patent: Mar. 8, 1994

[54] METHOD AND APPARATUS FOR FEEDING AND TIGHTENING THREADED PARTS

[76] Inventor: Yoshitaka Aoyama, 20-11, Makitsukadai 2-chome, Sakai-shi, Osaka 590-01, Japan

[21] Appl. No.: 978,610

[22] Filed: Nov. 19, 1992

Related U.S. Application Data

[63] Continuation-in-part of Ser. No. 691,059, Jun. 24, 1991, abandoned.

[30] Foreign Application Priority Data

| Dec. 1, 1989 | [JP] | Japan | 1-314058 |
| Dec. 1, 1989 | [JP] | Japan | 1-314059 |
| Dec. 23, 1989 | [JP] | Japan | 1-334576 |
| Apr. 4, 1992 | [JP] | Japan | 4-127685 |
| Apr. 4, 1992 | [JP] | Japan | 4-127864 |
| Apr. 6, 1992 | [JP] | Japan | 4-131314 |

[51] Int. Cl.$^5$ .................. B23Q 7/08; B23Q 17/22; B23P 19/06
[52] U.S. Cl. .................. 29/407; 29/456; 29/705; 29/810; 29/813; 29/240
[58] Field of Search .................. 29/407, 456, 705, 720, 29/809, 810, 813, 240

[56] References Cited

U.S. PATENT DOCUMENTS

| 2,974,406 | 3/1961 | Vilmerding | 29/240 |
| 3,675,302 | 7/1972 | Dixon | 29/240 |
| 3,750,257 | 8/1973 | Berecz | 29/240 |
| 3,760,485 | 9/1973 | Smith | 29/813 |
| 3,929,176 | 12/1975 | Dixon | 29/813 |
| 4,048,687 | 9/1977 | Kato et al. | 29/407 |
| 4,201,255 | 5/1980 | Donnelli et al. | 29/810 |

Primary Examiner—P. W. Echols
Assistant Examiner—David P. Bryant
Attorney, Agent, or Firm—Nikaido Marmelstein Murray & Oram

[57] ABSTRACT

The present invention is directed to a method and apparatus for feeding and tightening threaded parts, such as bolts or nuts. The apparatus incorporates a holding member longitudinally movable while holding a threaded part at the front end thereof, and a rotary feed rod having an engaging head at the front end thereof adapted to engage the threaded part. A retractable detecting member is used to detect the presence of a threaded part in the holding member. The rotary feed rod is longitudinally movable wherein, first, the holding member holds the threaded part at or adjacent the end of a part feeding passage and is then longitudinally moved to a position where the threaded part is coaxial with the feed rod. The engaging head of the feed rod is then advanced, and substantially at the same time as the engaging head engages the threaded part the holding member is moved backward to allow the feed rod to be advanced. Thus, the threaded part is fed to a mating part, such as a threaded hole or a bolt, and tightened.

38 Claims, 10 Drawing Sheets

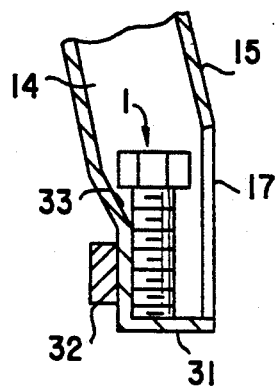
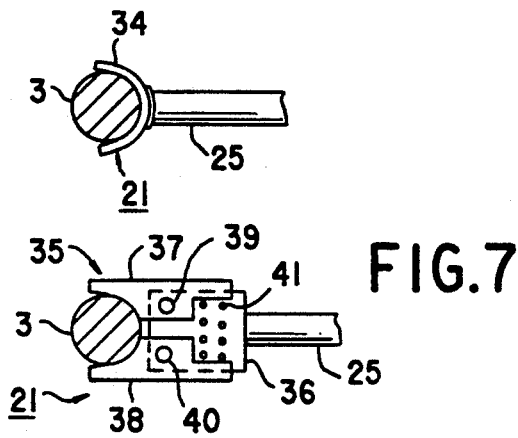
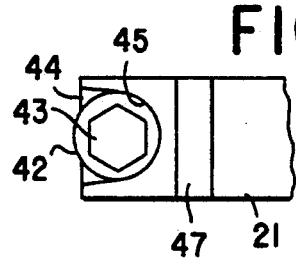
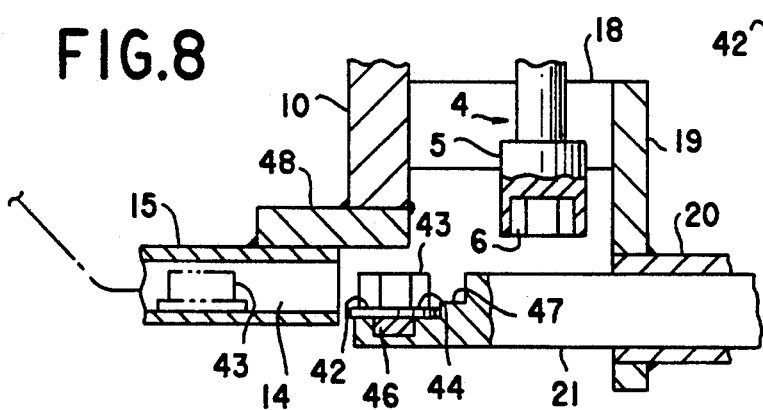
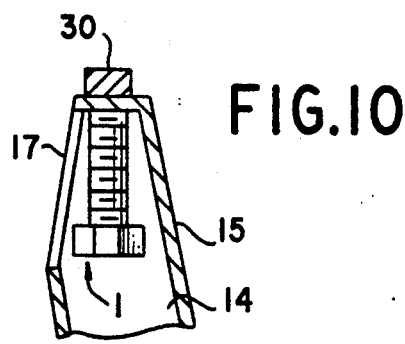

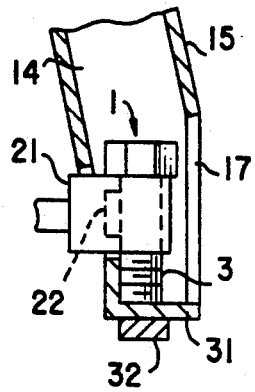
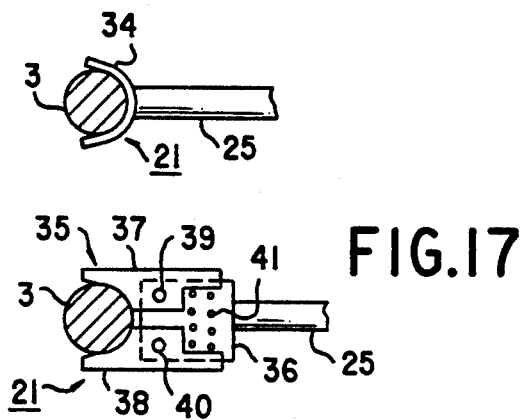
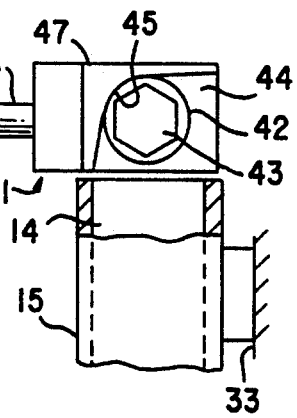
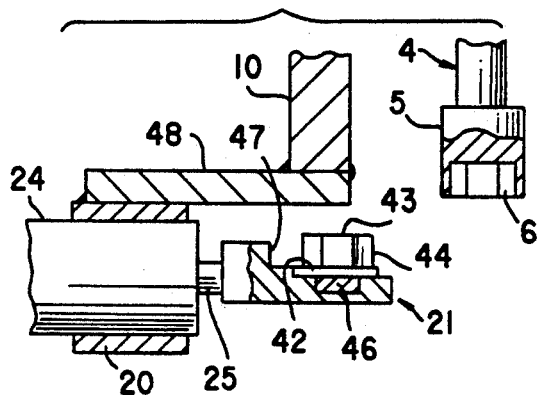
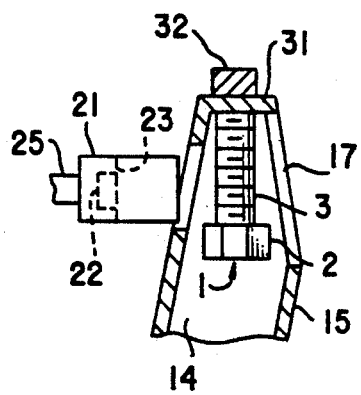

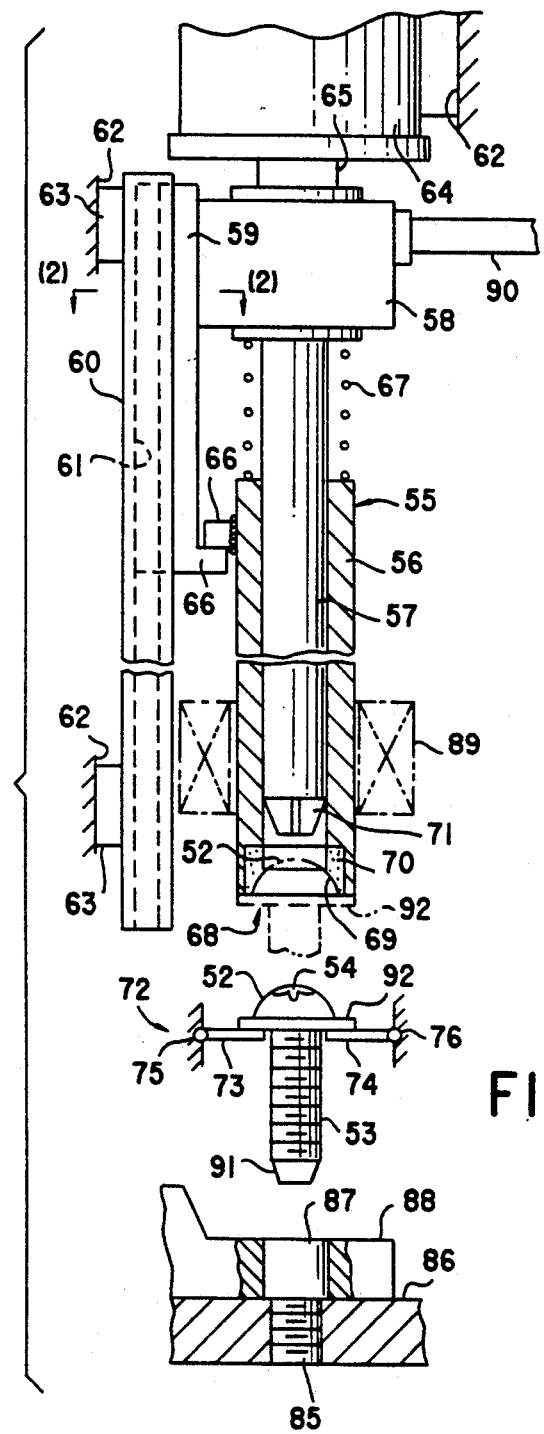

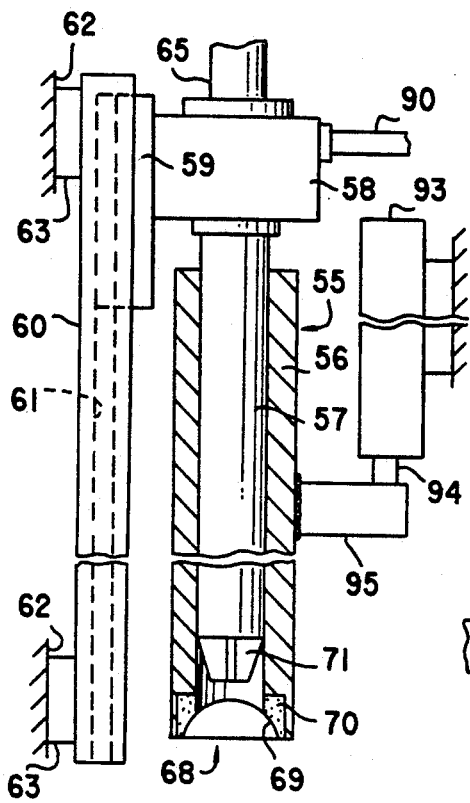
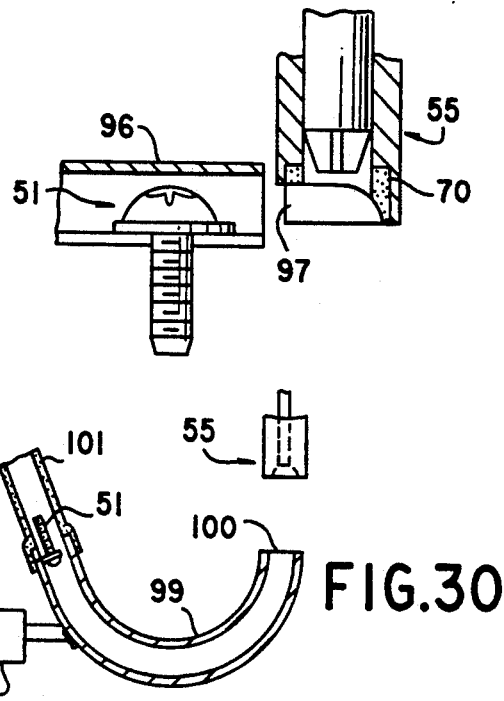
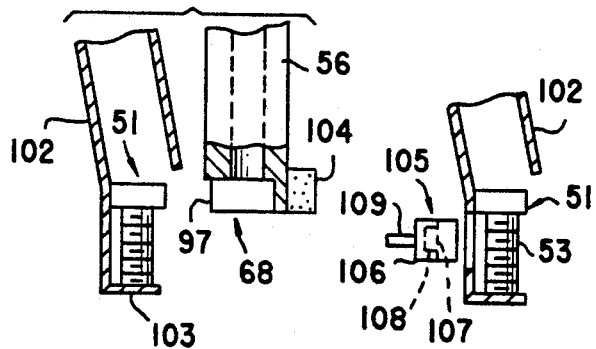
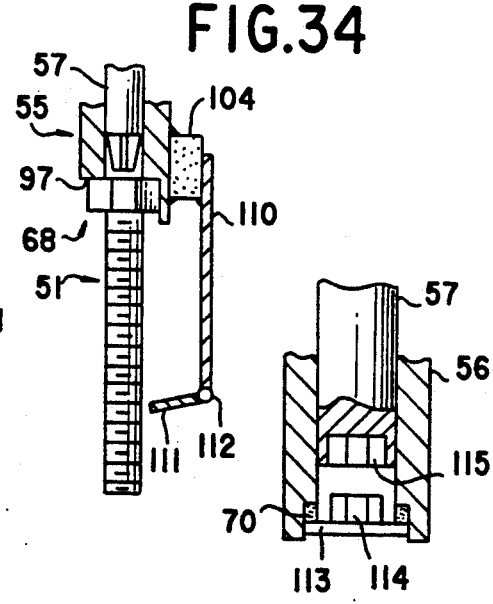
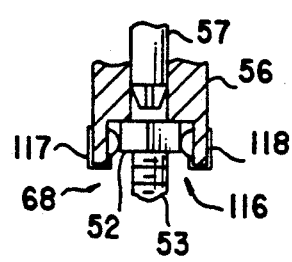

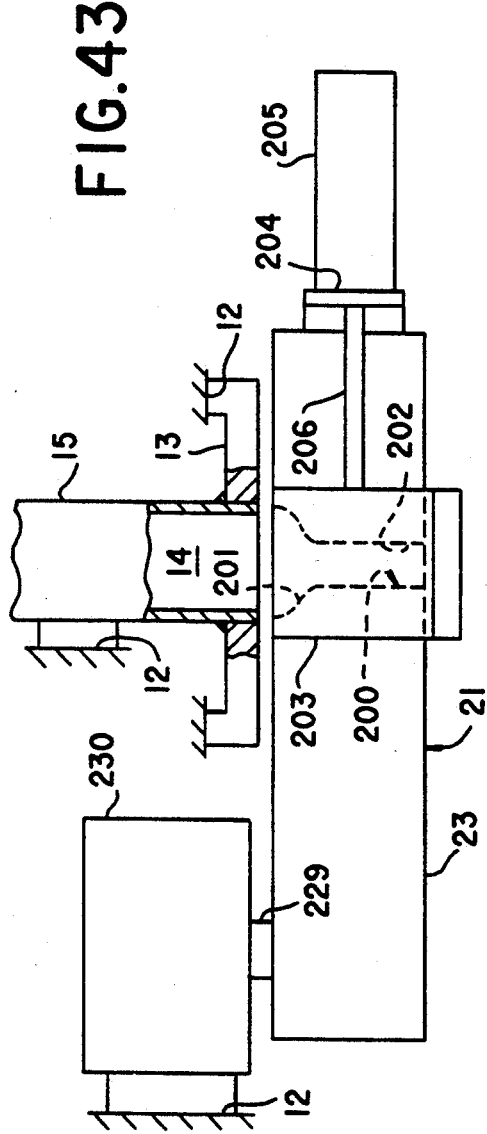

METHOD AND APPARATUS FOR FEEDING AND TIGHTENING THREADED PARTS

This is a continuation-in-part of application Ser. No. 07/691,059 filed Jun. 24, 1991, now abandoned.

BACKGROUND OF THE INVENTION

The present invention relates to the feeding and tightening of threaded parts, such as bolts or nuts, and is intended to improve the nut runner or bolt runner which is in general use to provide an automatic version thereof. The invention in one embodiment incorporates a method of supplying the threaded parts to a predetermined objective position by operating a part-supply rod, provisionally storing them in a movable part-holding device before initiating transfer of said individual parts to this supply rod, and then causing the supply rod to properly supply each of these parts to the predetermined objective position. The present invention can incorporate a device for setting the axial position of a shaft-like part and a part-supply apparatus incorporating an axial-position setting device.

The present invention also relates to a detecting device for detecting the threaded parts while being held by the movable part-holding device of a parts feeding apparatus. More particularly, the detecting device is available for a part-supply system which supplies the threaded parts to a predetermined objective position by engaging each part with the part-holding device of a part-supply rod.

In the prior art, conventional parts-feeding devices comprise a rotary advance and retraction type feed rod having an engaging head with a mechanism for temporarily locking a threaded part fed onto the axis of the rod. The feed rod is advanced toward a part which is in the locked state, so that the engaging rod holds the part and feeds the latter to an intended place (i.e., to a mating part such as a threaded hole or a bolt) and concurrently effects tightening.

According to the prior art described above, a single mechanism has to perform both the positioning of a part on the axis of the feed rod and the temporary firm locking of the part. Therefore, such a mechanism must be necessarily of high precision, and even a slight decrease in precision would upset the correct engagement between the engaging head and the part, causing the problem of the part falling off. What should be given serious consideration is that such a locking mechanism makes it impossible to feed threaded parts to a narrow place. Further, the temporary locking of the part on the axis of the feed rod makes it necessary to limit the installation space for the temporary locking mechanism to a great extent or to install the mechanism in front of tile engaging head at a substantial distance from the latter. As a result, the apparatus is necessarily long in size. What is more important is that if the main body of a threaded part is hemispherical, with the conventional approach employed, that part cannot be held.

Typically, conventional part-supply systems initially cause each part to directly arrive at the axial line of a part-supply rod and then moves the part-supply rod forward in order that each part can properly be supplied to a predetermined objective position. Such a conventional arrangement has been disclosed, for example, in the Japanese Laid-Open Patent Publication No. 60131167 of 1985 according to a proposal of Yutani Iron Works, Ltd. Concretely, this system directly supplies each part onto the axial line of a part-supply rod so that the delivered part can be attracted on the surface of a magnet and then moves the part-supply rod forward in order to hold the delivered part before transferring it to a predetermined objective position.

According to the prior art cited above, those sequential steps are serially executed, which include a step of the individual part arriving at the axial line of the part supply rod and another step for the part-supply rod to hold the part before delivering it to a predetermined objective position. Consequently, the time needed for implementing both steps makes up a summative value. This in turn obstructs the need to promote operating efficiency.

Also in the prior art, the Japanese Laid-Open Patent Publication No. 60-131167 of 1985 (based on the art proposed by Yutani Iron Works, Ltd.) disclosed setting a specific position of a circular-sectional shaft-like part which causes a bolt substantially corresponding to a shaft-like part to be absorbed on the surface of a plane magnet so that the bolt can be set to a position coaxial with a part-supply rod provided for the proposed part-supply system.

However, since the supplied bolt is positioned merely by being absorbed on the surface of a magnet, the correct position of the supplied bolt cannot in any way be determined in any of the operating routines. Furthermore, even when operating an industrial robot system which frequently shifts its own posture and position and quickly halts itself, unless the supplied part is securely retained, the delivered part easily deviates its position as a result of inertial force. Thus, the delivered part cannot correctly be engaged with the part-supply rod.

As noted in the above discussion, there are a variety of conventional part-supply systems which provisionally engage individual parts to enable the following part-supply rod to hold the supplied part. However, no practical means has ever been provided for any of these conventional part-supply systems to check and confirm whether or not the supplied part is correctly held at the predetermined objective position, or whether the supplied part has already arrived at this predetermined position.

Therefore, conventional part-supply systems have a critical problem to overcome. For example, any conventional part-supply system cannot properly be operated when the supplied part is not properly engaged with a part-supply rod or not delivered to it due to a part's deviated position or its actual absence from the part-supply rod.

SUMMARY OF THE INVENTION

The present invention has been presented to solve the problems described above. One form of the invention is characterized in that a part holding member adapted to be advanced and retracted holds a part, such as a bolt or nut, at the end of a part feeding passage, and is moved backward to a position where the part is coaxial with a rotary feed rod. Substantially at the same time as the engaging head of the feed rod is advanced to engage the part, the holding member is further retracted and the feed rod is advanced. The invention effects the part holding step, the part positioning step, the feed rod advancing step and the rotating and tightening step. The holding member for the threaded part is installed for advancing and retraction movement and the end of the part feeding tube is opened on or adjacent the advance and retraction axis thereof. Thus, it is possible to install a rotary advance and retraction type feed rod having an engaging head disposed orthogonal to the advance and retraction axis. It is possible to add a part holding means to the front end of the holding member.

Another form of the invention is characterized in that a part holding member adapted to be advanced and retracted holds a part, such as a bolt or nut, at the end of a part feeding passage, and is moved backward to a position where the part is coaxial with a rotary feed rod. Substantially at the same time as the engaging head of the feed rod is advanced to engage the part, the holding member is further retracted and the feed rod is advanced. The invention effects the part holding step, the part positioning step subsequent to the advance movement of the holding member, the step of the engaging means engaging the part, the holding member retraction step to be effected substantially concurrently therewith, and the feed rod advancing, rotating and part tightening step.

Such a method can be embodied by an apparatus in which the holding member is positioned so that it is on standby in the vicinity of the end of the part feeding tube and which includes a rotary advance and retraction type feed rod having an engaging head disposed orthogonal to the advancing and retraction axis of the holding member.

Another form of the invention is a method characterized by the steps of holding a threaded part by the front end of an outer shaft and transporting it to an intended place, advancing and rotating an inner shaft received in the outer shaft to threadedly attach it to a mating part. The holding and transporting of the threaded part is effected on the outer shaft side and the tightening of the threaded part thereafter or subsequent thereto is effected on the inner shaft side.

Such a method can be embodied by an apparatus comprising a feed rod constituted by an outer shaft and an inner shaft received therein, a threaded-part holding portion installed on the front end of the outer shaft, the inner shaft being adapted for relative axial and rotational movement in the outer shaft, and an engaging portion installed on the front end of the inner shaft for engaging the threaded part.

A chucking mechanism can be provided on the holding portion to thereby effect the holding of the part on the other shaft side.

A magnetic attraction force can be applied to the holding portion, so that the holding of the part by the outer shaft side is magnetically effected.

The engaging portion can be shaped to conform with a recess formed in the threaded part, whereby torque and thrust are transmitted.

The engaging portion can be box-shaped to receive the threaded part, whereby torque and thrust are transmitted.

In another embodiment of the invention, a movable part-holding device initially holds an individual part at a predetermined part-receiving position, and then the movable part-holding device shifts its position in order to transfer the retained part onto the axial line of a part-supply rod. Next, after completing engagement of the transferred part with the tip of the part-supply rod, the part holding device returns to the part receiving position. Next, the part-supply rod moves forward. Characteristically, after moving forward, while the part-supply rod executes a part-supply operation, a subsequent part is held by the part-holding device at the part receiving position. The part-holding device receives the subsequent part simultaneous and in parallel with the delivery of the part from the part-supply rod.

According to another embodiment of the invention, a device for setting the axial position of a shaft-like part (in other words, a supplied bolt for example) causes a receptor of a part-holding member to accommodate a circular-sectional shaft-like part. The receptor is internally provided with a reference surface on the bottom and another reference surface on a side. The device is provided with a pressing member internally having a cam surface which comes into contact with the inserted part. The supplied part is then brought into contact with the reference surfaces on the bottom and side of the receptor by causing the cam surface to press against the supplied part so as to enable the part-holding system to correctly set the axial position of the supplied part. Pressure delivered from the cam surface causes the supplied part to come into contact with the reference surfaces. As a result, the axial position of the supplied part can securely be set.

The receptor can be defined to have a rectangular-sectional grooved recess formation, where two of the orthogonally intersecting planes make up the above-identified reference surfaces on its bottom and a side wall.

In one variation of this embodiment of the invention, the part-supply system transfers an individual shaft-like part held by a part-holding member at the part-receiving position to a predetermined position which is coaxial with a part supply rod, and then causes the delivered part to be engaged with the part-supply rod before the supplied part is eventually delivered to the objective position. Since the axial position of the part-holding member is determined prior to contact with the part-supply rod, the axial position of the part-holding member correctly matches the axis of the part-supply rod.

In another variation, a receptor of a part-holding member for accommodating a circular-sectional shaft part is provided with a grooved recess properly matching the shape of the delivered part, wiht a pressing member also provided in order to press the inserted part. The grooved recess is formed with a shape perfectly matching the delivered part. Thus, when the delivered part contacts the part-supply rod, the axial position of the delivered part is already correctly set. By virtue of the perfect compatibility of the delivered part with the shape of the grooved recess provided for the receptor, the axis of the supplied part is precisely aligned with the predetermined position.

In the above and other embodiments, the invention can embody a novel part-supply system which securely feeds individual parts by engaging each of the supplied parts with the tip of a part-supply rod. Characteristically, the part-holding device of this novel system is provided with a detecting member which checks and confirms whether or not the supplied part is provisionally held by the part-holding device. The detecting member detects either the deviated position of the supplied part or the absence of part via its own movement, thus securely preventing the part-supply system from following up operations under abnormal condition.

BRIEF DESCRIPTION OF THE DRAWINGS

FIG. 5 is a longitudinal sectional view of the open end of a part feeding tube;

FIGS. 6 and 7 are plan views of the holding member;

FIG. 8 is a longitudinal sectional view snowing a modification of the apparatus shown in FIG. 1;

FIG. 9 is a plan view of the holding member shown in FIG. 1;

FIG. 10 is a longitudinal sectional view of the open end of a part feeding tube.

FIG. 15 is a longitudinal sectional view of the open end of the part feeding tube;

FIG. 16 and 17 are plan view of the holding member;

FIG. 18 is a longitudinal sectional view showing a modification apparatus shown in FIG. 11;

FIG. 19 is a plan view of the holding member shown in FIG. 18;

FIG. 20 is a longitudinal sectional view of the open end of a part feeding tube;

FIG. 21 is a longitudinal sectional view showing a third embodiment of the invention;

FIG. 22 is a sectional view taken along the line 2—2 in FIG. 21;

FIG. 23 is a plan view of a temporary stopping device shown in FIG. 21;

FIG. 24 is a sectional view taken along the line 4—4 in FIG. 23;

FIGS. 25 and 27 are plan views of bolts;

FIG. 26 is a sectional view of the bolt shown in FIG. 25;

FIGS. 28 through 32 and 34 through 36 are sectional views showing modifications of the apparatus shown in FIG. 21;

FIG. 33 is a sectional view of a transfer chuck shown in FIG. 32;

FIG. 43 is a lateral view of the part-holding device available for implementing a sixth embodiment of the invention;

FIG. 44 is a plan of the part-holding device shown in FIG. 43;

BEST MODE FOR EMBODYING THE INVENTION

Figure 1:
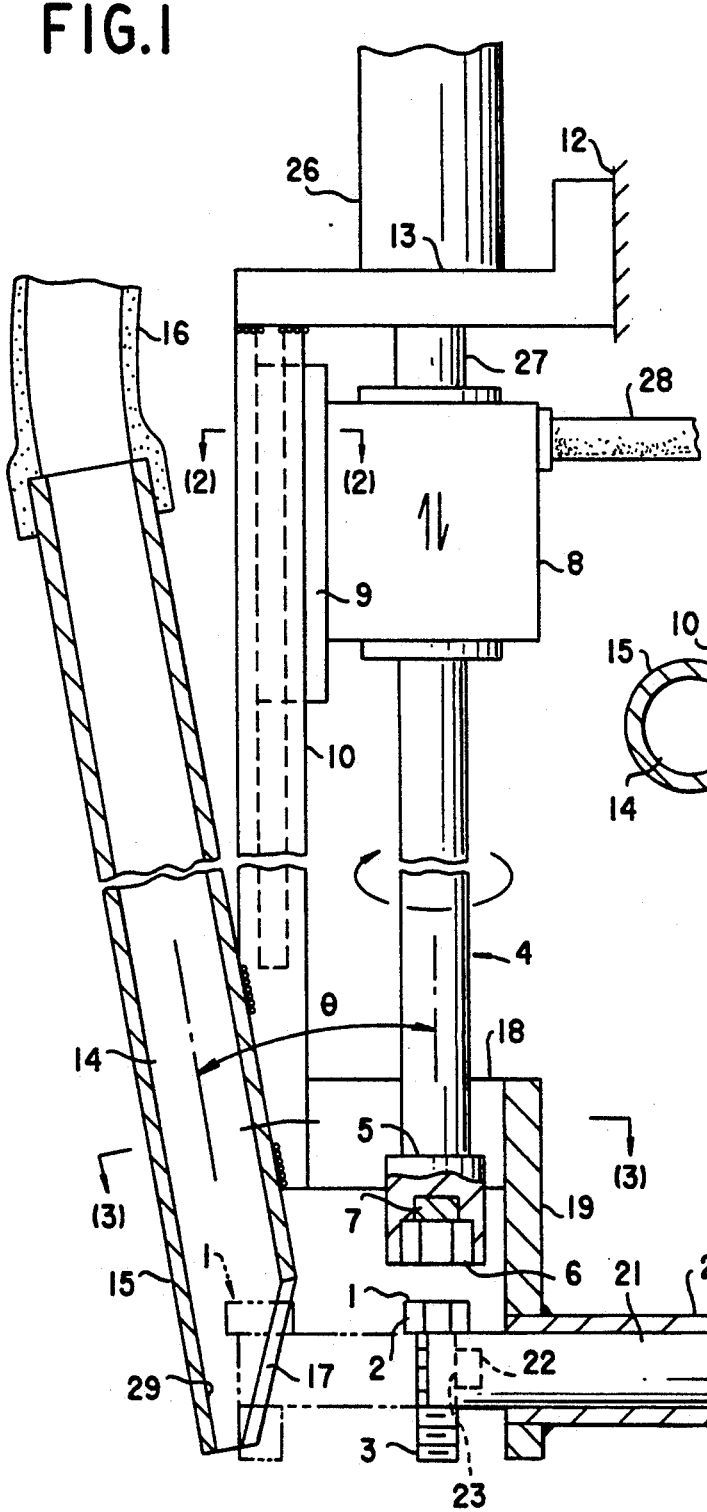
FIG. 1 is a sectional view of an apparatus according to an embodiment of the invention.
Figure 2:
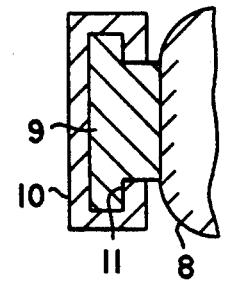
FIG. 2 is a sectional view taken along the line 2—2 in FIG. 1.
Figure 3:
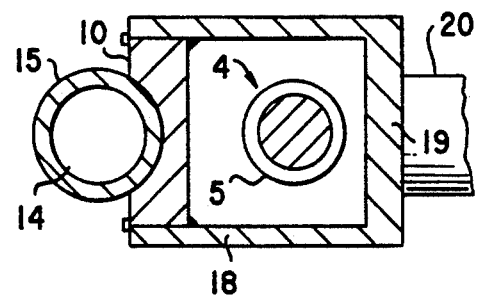
FIG. 3 is a sectional view taken along the line 3—3 in FIG. 1.
Figure 4:
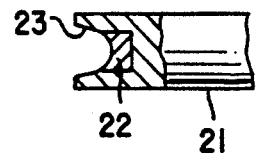
FIG. 4 is a plan view of a holding member shown in FIG. 1.
Figure 11:
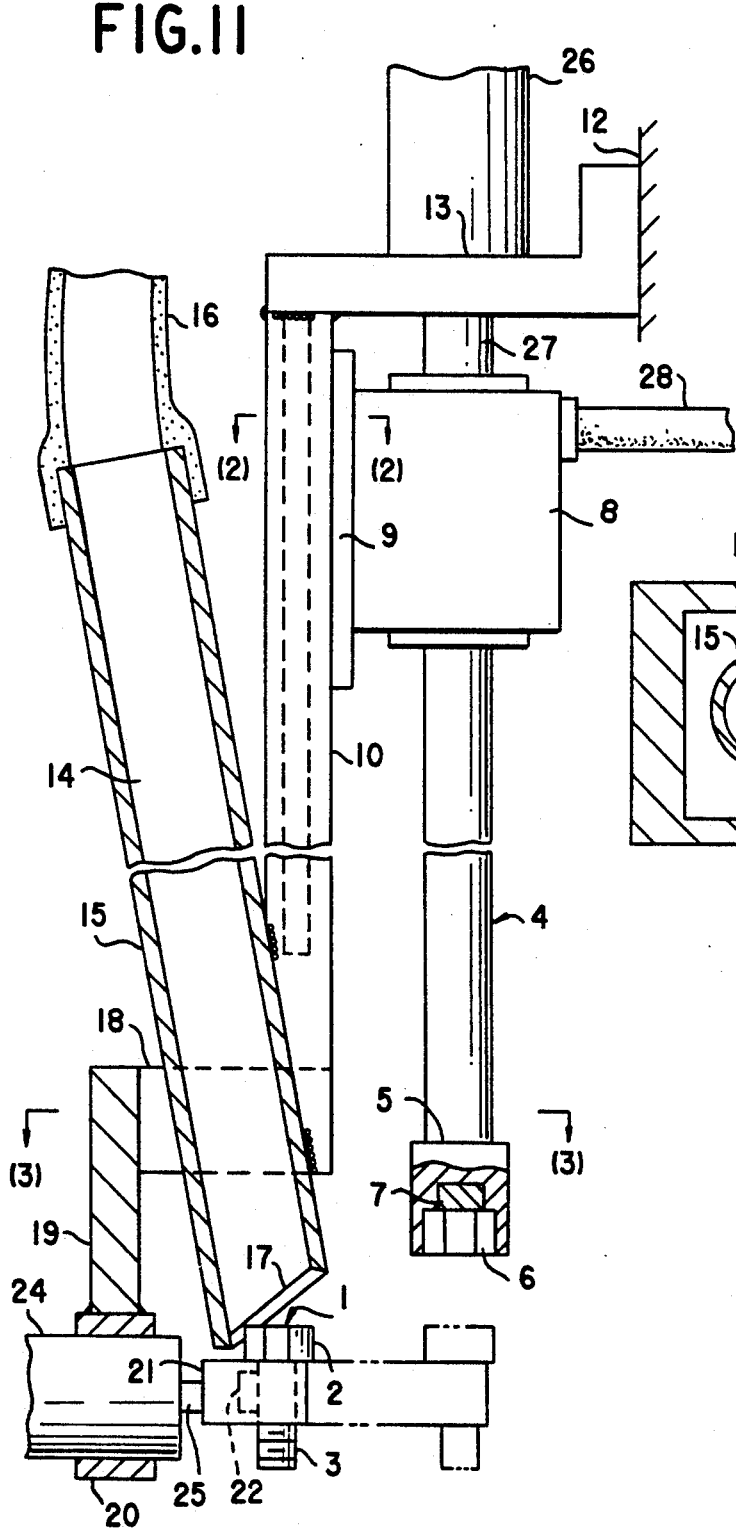
FIG. 11 is a longitudinal sectional view of an apparatus according to a second embodiment.
Figure 12:
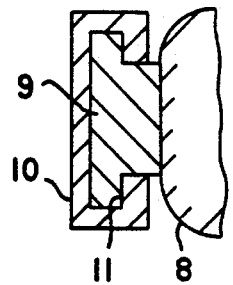
FIG. 12 is a sectional view taken along the line 2—2 in FIG. 11.
Figure 13:
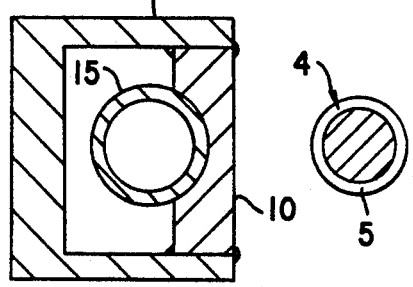
FIG. 13 is a sectional view taken along the line 3—3 in FIG. 11.
Figure 14:
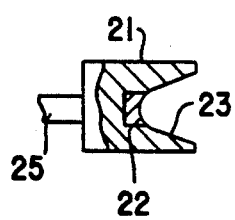
FIG. 14 is a plan view, partly broken away, of the holding member, shown in FIG. 11.

First, an embodiment shown in FIGS. 1 through 4 will be described. The part to be handled in this embodiment is a bolt 1, the reference numeral 2 denoting the head and 3 denoting the stem thereof. A rotary advance and retraction type feed rod 4 has an engaging head 5 with an engaging hole 6 adapted to snugly receive the bolt head 2. In the illustrated example, the head 2 is, e.g., hexagonal and so is the engaging hole 6. Further, a magnet (permanent magnet) 7 is installed to prevent the bolt I from falling.

The feed rod 4 is driven for rotation by a compressed air type rotary motor 8, and a slide element 9 joined to the rotary motor 8 is adapted to be advanced and retracted along a guide rail 10. As Is clear from FIG. 2, the guide rail 10 is formed with a dovetail groove 11, in which the slide element 9 is fitted. The guide rail 10 is welded to a fixed element 13 attached to a stationary member 12.

A part feeding tube 15 having a part feeding passage 14 is installed to extend with an acute angle 0 with respect to the stroke direction of the feed rod 4. As shown, it is welded to the lower portion of the guide rail 10 and has a feed hose 16 made of soft synthetic resin connected to tile tipper end thereof and an opening 17 formed by an oblique cutting at the lower end thereof.

A bracket 18 having a U-shaped cross-section (see FIG. 3) is welded to the guide rail 10 and has an attaching plate 19 extending downward therefrom, with a guide tube 20 welded to the attaching plate 19. A part holding member 21 in the form of a bar is slidably fitted in the guide tube 20, the advance and retraction axis of the part holding member 21 being orthogonal to that of the feed rod 4. The opening 17 is located on or adjacent the advance and retraction axis of the holding member 21 and is spaced a suitable distance from the advance and retraction axis of the feed rod 4.

A magnet (permanent magnet) 22 serving as means for holding a part is fixed to the holding member 21. As is clear from FIG. 4, the front end of the holding member 21 is formed with a U-shaped recess 23, in which the magnet 22 is fixedly housed. An air cylinder 24 is joined to the guide tube 20, with its piston rod 25 connected to the holding member, 21. The air cylinder 24 has the function of providing the holding member, 21 with three positions: a first position where the recess 23 is on standby at the opening 17, a second position where the bolt 1 and the feed rod 4 are coaxial with each other, and a third position spaced away from the feed rod 4 so as not to interfere with its forward movement.

In addition, a main cylinder 26 is attached to the fixed element 13, with its piston rod 27 connected to the rotary motor 8. The rotary motor 8 illustrated is driven by compressed air, and to this end an air hose 28 is connected thereto. The air hose 28 has sufficient length and flexibility to follow the advance and retraction of the rotary motor 8. Further, though not shown, there is a method for magnetizing the holding member 21 instead of using the magnet 22.

The operation of this embodiment will now be described. The holding member, 21 is extended to the opening 17, whereby the recess 23 and the inner surface 29 of the part feeding tube 15 opposed thereto define a passage which is sized to prevent passage of the head 2 of the bolt 1 while allowing the stem 3 to pass therethrough. Thus, when the bolt 1 comes through the feed passage 14 under such standby conditions, the stem 3 tends to pass through the recess 23 but it is attracted rightward by the magnet 22 while the lower surface of the head 2 contacts the upper surface of the holding member 21, when, as shown in dash double-dot lines in FIG. 1, the relative positions of the holding member 21 and the bolt 1 are determined; thus, the correct holding state is established.

Thereafter, the air cylinder 24 is actuated to retract the holding member 21 to the position (solid line position) where the bolt 1 is coaxial with the feed rod 4, with the holding member 21 thus waiting for the forward movement of the feed rod 4. When the feed rod 4 is advanced while rotating, the engaging hole 6 in the engaging head 6 is aligned with the head 2. Substantially at the same time as this, the holding member 21 is further retracted, when the feed rod 4 (engaging head 5) is advanced without interfering with the holding member 21, so that the stem 3 is screwed into the intended threaded opening (not shown) and tightened. The time "substantially at the same time" means a period of time from the start to the completion of insertion of the head 2 into the engaging hole 6.

In addition, the present invention is applicable to the feeding of parts with the direction of feeding vertical or horizontal. When it is desired to transport parts upward by air, a more reliable operation can be attained by installing a fall-preventing magnet (permanent magnet) 30 on the end of the part feeding tube 15, as shown in FIG. 10.

An embodiment shown in FIGS. 5 through 7 will now be described. This embodiment is of the type in which, rather than the holding member 21 being on standby at the opening 17, the holding member 21 is moved to catch the bolt 1 kept stationary adjacent the opening 17. That is, a stop plate 31 is fixed to the lower end of the part feeding tube 15 and a magnet (permanent magnet) 32 which serves to keep the bolt 1 upright is fixed to the outer surface of the part feeding tube 15. To cause the bolt 1 which has come down to stand upright correctly, the inner surface of the part feeding tube 15 is formed with a cam surface 33. The holding means 21 is constructed by attaching a horseshoe-shaped clamp 34 made of plate spring to the piston rod 25 of an air cylinder; thus, the clamp 34 elastically grips the bolt 1 which is on standby in the state shown in FIG. 5. thereafter, the same operation as in the preceding embodiment is performed. The clamp 34 may be replaced by a chuck 35, as shown in FIG. 7. A base plate 36 is fixed to the front end of the piston rod 25 and has a pair of jaws 37 and 38 attached thereto by pivots 39 and 40, the jaws 37 and 38 being adapted to grip the stem 3 therebetween. A coil spring 41 is disposed between the rear portions of the jaws 37 and 38 so as to elastically clamp the stem 3. This operation is the same as in FIG. 6.

The case when a nut 43 having a flange 42 will now be described with reference to FIGS. 8 and 9. The part feeding tube 15 is substantially horizontally disposed, so that the nut 43 coming in moves onto the holding member 21 which is on standby close to the end of the part feeding tube 15. The front end of the holding member 21 is formed with a step portion 44 for receiving the flange 42 and is provided with an arcuate portion 45 (see FIG. 9) which serves to position the circular flange 42. And a magnet (permanent magnet) 46 is embedded in the step portion 44. Further, another step portion 47 is provided to allow approach of the engaging head 5. In addition, the part feeding tube 15 is welded to the guide rail 10 through a bracket 48. The holding member 21 is on standby in the position shown in solid lines, and when the nut 43 comes thereto, it is positioned by cooperation of the arcuate portion 45 and magnet 46. The subsequent operation is the same as in FIG. 1.

According to the present invention, since the holding member is adapted to hold a part at a place remote from the axis of the feed rod, there is no need of holding it on the axis of the feed rod, the holding of the part being effected very accurately and smoothly. After holding the part in this manner, the holding member is retracted until it is coaxial with the feed rod. Therefore, the above-mentioned coaxial state can be easily attained and the engagement between the engaging head and the part can be effected smoothly. Substantially at the same time as this engagement, the holding member is retracted. Thus, the feed rod can be advanced without any trouble. With the above-described actions successively performed, a reliable method free from the falling-off of parts which would be otherwise caused by inaccuracy has been attained.

Since the end of the part feeding tube is opened on or adjacent the advancing and retraction axis of the holding member, there is obtained a construction which is capable of reliably receiving the part at a place deviated from the axis of the feed rod. Since the holding member and the feed rod are disposed orthogonal to each other, the alignment of the part and the engaging head can be accurately attained during the forward movement of the feed rod.

Because of the type adapted to receive the part at a place remote from the axis of the feed rod, various constructions matching with the size and-weight of parts can be employed as means for holding the part which is fed to the front end of the holding member, a fact which is very suitable for realizing the best operation.

An embodiment shown in FIGS. 11 through 14 will now be described. The part to be handled in this embodiment is a bolt 1, the reference numeral 2 denoting the head and 3 denoting the stem thereof. A rotary advance and retraction type feed rod 4 has an engaging head 5 with an engaging hole 6 adapted to snugly receive the bolt head 2. In the illustrated example, the head 2 is, for example, hexagonal and so is the engaging hole 6. Further, a magnet (permanent magnet) 7 is installed to prevent the bolt 1 from falling.

The feed rod 4 is driven for rotation by a compressed air type rotary motor 8, and a slide element 9 joined to the rotary motor 8 is adapted to be advanced and retracted along a guide rail 10. As is clear from FIG. 12, the guide rail 10 is formed with a dovetail groove 11, in which the slide element 9 is fitted. The guide rail 10 is welded to a fixed element 13 attached to a stationary member 12.

A part feeding tube 15 having a part feeding passage 14 is installed to extend with an acute angle with respect to the stroke direction of the feed rod 4. As shown, it is welded to the lower portion of the guide rail 10 and has a feed hose 16 made of soft synthetic resin connected to the upper end thereof and an opening 17 formed by oblique cutting at the lower end thereof.

A bracket 18 having a U-shaped cross-section (see FIG. 13) is welded to the guide rail 10 and has an attaching plate 19 extending downward therefrom, with a guide tube 20 welded to the attaching plate 19. A part holding member 21 in the form of a bar is slidably fitted in the guide tube 20, the advance and retraction axis of the part holding member 21 being orthogonal to that of the feed rod 4. The opening 17 is located on or adjacent the advance and retraction axis of the holding member, 21 and is spaced a suitable distance from the advance and retraction axis of the feed rod 4.

A magnet (permanent magnet) 22 serving as means for holding a part is fixed to the holding member 21. As is clear from FIG. 14, the front end of the holding member 21 is formed with a U-shaped recess 23, in which the magnet 22 is fixedly housed. An air cylinder 24 is joined to the guide tube 20, with its piston rod 25 connected to the holding member 21. The air cylinder 24 has the function of providing the holding member 21 with two positions: a first position, shown in dotted lines, where the recess 23 is on standby at the opening 17 (i.e., in the vicinity of the end of the part feeding tube 15) and a second position, shown in solid lines, where the bolt 1 and the feed rod 4 are coaxial with each other.

In addition, a main cylinder 26 is attached to the fixed element 13, with its piston rod 27 connected to the rotary motor 8. The rotary motor 8 illustrated is driven by compressed air, and to this end an air hose 28 is connected thereto. The air hose 28 has sufficient length and flexibility to follow the advance and retraction of the rotary motor 8. Further, though not shown, there is a method for magnetizing the holding member 21 instead of using the magnet 22.

The operation of this embodiment will now be described. The holding member 21 takes the solid line position where its recess 23 is adjacent the opening 17, thereby preventing passage of the head 2 of the bolt 1 while allowing passage of the stem 3. When the bolt 1 comes through the feed passage 14 under such standby conditions, the stem 3 tends to pass through the recess 23 but it is attracted leftward by the magnet 22 while the lower surface of the head 2 contacts the upper surface of the holding member 21 when, as shown in solid lines in FIG. 11, the relative positions of the holding member 21 and the bolt 1 are determined. Thus, the correct holding state is established.

Thereafter, the air cylinder 24 is actuated to advance the holding member, 21 to the dash-double-dot line position where the bolt 1 is coaxial with the feed rod 4, with the holding member 21 thus waiting for the forward movement of the feed rod 4. When the feed rod 4 is advanced while rotating, the engaging hole 6 in the engaging head 6 is aligned with the head 2. Substantially at the same time as this, the holding member, 21 is further retracted, when the feed rod 4 (engaging head 6) is advanced without interfering with the holding member 21, so that the stem 3 is screwed into the intended threaded opening (not shown) and tightened. The time "substantially at the same time" is to be understood to mean a period of time from the start to the completion of insertion of the head 2 into the engaging hole 6.

In addition, the present invention is applicable to the feeding of parts with the direction of feed being vertical or horizontal. When it is desired to transport parts upward by air, more reliable operation can be attained by installing a fall-preventing magnet (permanent magnet) 30 on the end of the part feeding tube 15, as shown in FIG. 20.

An embodiment shown in FIGS. 15 through 17 will now be described. This embodiment is of the type in which the holding member 21 is on standby at a position shown in FIG. 15 or a position shown in FIG. 20 and a magnet 32 is attached to a stop plate 31 on the part feeding tube so that the bolt 1 which has come in is temporarily locked by the magnet 32, as shown, and the bolt 1 in this state is moved toward the opening 17. As another holding means, it is constructed by attaching a horseshoe-shaped clamp 34 made of plate spring to the piston rod 25 of an air cylinder, as shown in FIG. 6; thus, the clamp 34 elastically grips the stem 3 of the bolt 1, from the left as seen in the figure, which is on standby in the state shown in FIG. 5. Thereafter, the same operation as in the preceding embodiment is performed.

FIG. 17 shows a chuck 35 used in place of the clamp 34, in which case a base plate 36 is fixed to the front end of the piston rod 25 and a pair of jaws 37 and 38 are attached thereto by pivots 39 and 40, the Jaws 37 and 38 being adapted to grip the stem 3 therebetween. A coil spring 41 is disposed between the rear portions of the jaws 37 and 38 so as to elastically clamp the stem 3. This operation is the same as in FIG. 16.

The case when a nut 43 having a flange 42 will now be described with reference to FIGS. 18 and 19. The part feeding tube 15 is substantially horizontally disposed orthogonal to the direction of advance and retraction of the holding member, 21, so that the nut 43 coming in moves onto the holding member 21 which is on standby close to the end of the part feeding tube 15. The front end of the holding member 21 is formed with a step portion 44 for receiving the flange 42 and is provided with an arcuate portion 45 (see FIG. 19) which serves to position the circular flange 42. And a magnet (permanent magnet) 46 is embedded in the step portion 44. Further, another step portion 47 is provided to allow approach of the engaging head 5. In addition, the part feeding tube 15 is fixed to the stationary member 33, and the support tube 20 for fixing the air cylinder 24 is Joined to the guide rail 10 through a bracket 48. The holding member 21 is on standby in the position shown iii solid lines, and when the nut 43 from the part feeding tube 15 comes thereto, it is positioned by cooperation of the arcuate portion 45 and magnet 46. the subsequent operation is the same as in Fig.

According to the present invention, since the holding member, is adapted to hold a part at a place remote from the axis of the feed rod, there is no need of holding it on the axis of the feed rod, the holding of the part being effected very accurately and smoothly. After holding the part in this manner, the holding member is retracted until it is coaxial with the feed rod; therefore, the abovementioned coaxial state can be easily attained and the engagement between the engaging head and the part can be effected smoothly. And substantially at the same time as this engagement, the holding member is retracted; thus, the feed rod can be advanced without any trouble. With the described actions successively performed, the reliable method free from the falling-off of parts which would be otherwise caused by inaccuracy has been attained.

Since the holding member is positioned so that it is on standby adjacent the end of the part feeding tube, there is obtained a construction which is capable of reliably receiving the part at a place deviated from the axis of the feed rod. Since the holding member and the feed rod are disposed orthogonal to each other, the alignment of the part and the engaging head can be accurately attained during the forward movement of the feed rod.

Because of the type adapted to receive the part at a place remote from the axis of the feed rod, various constructions matching with the size and weight of parts can be employed as means for holding the part which is fed to the front end of the holding member, a fact which is very suitable for realizing the best operation.

The feeding and tightening of a nut taken as an example of a threaded part has so far been described. In an embodiment to be described below, a headed bolt is taken as an example of a threaded part, some forms being shown in FIGS. 25 through 27. The bolt 51 comprises a head 52 and a stem 53, and the head 52 is hemispherical and when seen in a plan view it is circular, as shown in FIG. 25 or 27. The head 52 is formed with a crisscross or square recess 54. The form shown in FIG. 25 is generally called a plus screw.

The embodiment shown in FIGS. 21 through 24 will now be described. A feed rod 65 comprises a hollow outer shaft 56 and an inner shaft 57 inserted therein, the inner shaft 57 being capable of relative movement axial and rotational directions within the outer shaft. The inner shaft 57 is the output shaft of a rotatable motor 58 or is connected to the output shaft of the rotatable motor 58. The rotatable motor 8 is fixed to a slide member 59. As is clear from FIG. 22, the guide rail 60 is formed with a dovetail groove 61, in which the slide member 59 is fitted. In addition, the guide rail 60 is firmly joined to a stationary member 62 through a bracket 63. The piston rod 65 of an operating cylinder, 64 fixed to the stationary member 62 is joined to the rotatable motor 58, thereby advancing and retracting the slide member 59 and hence the feed rod 55 along the guide rail 60. In addition, the rotatable motor 68 uses compressed air as a drive source, and for this purpose, a hose 90 is connected thereto.

A pin 661 fixed on the outer shaft 56 abuts against a projection 66 on the slide member, 59, the abutment being maintained by the elastic force of a coil spring 67 disposed between the end of the outer shaft 56 and the rotatable motor, 58.

The front end of the outer shaft 56 is provided with a holding member, 68 which is shaped to receive the bolt-head 52 and which has the function of holding the bolt 51. That is, it is formed with a partly spherical portion 69 matching with the hemispherical shape of the bolt-head 52 and an annular magnet (permanent magnet) 70 is fixed to the opening in the outer shaft 56, as shown.

The front end of the inner shaft 57 is provided with an engaging portion 71 matching with the recess 54 in the head. In this case, it is in the form of the tip of a screwdriver.

This embodiment is of the type in which with the bolt 51 temporarily locked, the feed rod 55 is advanced thereto. Therefore, a temporary locking device 72 for the bolt 51 is installed and is shown in a plan view in FIG. 23. A pair, of opening and closing plates 73 and 74 are supported on pivot shafts 75 and 76 held by projections 77, 78, 79, 89 fixed to the stationary member 62. The pivot shafts 75 and 76 are provided with coil springs, not shown, normally urging the opening and closing plates 73 and 74 to the illustrated solid line positions. The opening and closing plates 73 and 74 are formed with a pair of notches 81 and 82 to receive the bolt stem 53. The guide tube 83 is formed with a slit 84 so that the bolt 61 is transported in its hanging state. The slit 84 is aligned with the notches 81 and 82, as shown in FIG. 23.

The mating part into which the bolt 51 is screwed is a base plate 86 having a threaded opening 85, and a part 88 having a through-hole 87 is placed thereon. In addition, the magnet 70 may be replaced by a solenoid coil 89 (shown in dot-double-dash lines).

The operation will now be described. The state shown in FIG. 21 is one in which the bolt 61 is temporarily on standby at the locking device 72. When the piston rod 65 of tile operating cylinder 64 is projected, the rotatable motor, 58 fixed to the slide member 59 is moved along the guide rail 60. Concurrently therewith, the feed rod 65 is also advanced while maintaining the relative positions of the outer and inner shafts as shown, until the holding portion 68 is aligned with the bolt head 52, whereupon the head 52 is received in the partly spherical portion 69 and attracted by the magnet 70. When the feed rod 55 is advanced together with the bolt 51, the opening and closing plates 73 and 74 are pushed open, allowing the bolt 51 to be released from the temporary locking device 72. And the bolt stem 53 enters the hole 87 in the part 88, with the taper portion 91 thereof engaging the inlet end of the threaded opening 85, whereupon the advancing movement of the outer shaft 56 is prevented, and the inner shaft 57 alone is advanced while compressing the coil spring 67, with the projection 66 separating from the pin 661. At this time, the inner shaft 57 is rotated by the rotatable motor 58, whereby the engaging portion 71 fits in the recess 54 of the head 52 and the bolt 51 is screwed into the threaded opening 85 to complete the attachment of the part 88.

In the case where the bolt 51 is formed with a flange 92 as shown, the end surface of the outer shaft 56 is adapted to contact the flange 92, as shown in FIG. 21, thereby increasing the stability of the bolt 51 and making it possible to dispense with the partly spherical portion 69.

In the embodiment shown in FIG. 21, the relative positions of the outer shaft and inner shafts have been determined by the coil spring 67, pin 661 and projection 65. In a modification shown in FIG. 28, such construction is replaced by an arrangement which enables the outer and inner shafts to be separately controlled. That is, the outer shaft 56 is connected to the piston rod 94 of an operating cylinder 93 through an arm 95. Thus, the outer rod 56 alone is advanced first while holding the bolt 51 and then the inner shaft 57 is operated as the piston rod 65 is advanced. Further, the outer and inner shafts 66 and 57 may be simultaneously advanced, in which case the outer shaft 56 is stopped first and then the screw tightening is effected by the inner shaft 57. The operation control of the cylinders 64 and 98 can be easily effected by using a known air control valve.

FIG. 29 shows a modification adapted to feed the bolt 51 in a direction orthogonal to the axis of the feed rod 55. The guide tube 96 is exactly the same as the one shown in FIG. 23, but the front end of the outer shaft 56 has an opening 97 directed to the guide tube 96, so that the bolt 51 coming in from one side is attracted by the magnet 70 in the holding portion 68.

FIG. 30 shows a modification adapted so that the bolt 51 coming in from below is fed to the feed tube rod 55 as shown in FIG. 21. There is a U-shaped tube 99 adapted to be advanced and retracted horizontally by an air cylinder 98. When the opening 90 is aligned with the holding portion 68 as shown, the feeding of the bolt 51 is effected. In addition, the U-shaped tube 99 has a flexible hose 91 connected thereto, aid hose extending from a part feeder (not shown).

FIG. 31 shows a modification in which the part feeding tube 102 and the feed rod 56 are disposed with an acute angle formed therebetween. At the same time as the bolt 51 stops on the stop plate 103, it is attracted toward the holding portion 68 by the magnet 104. The holding portion 68 is formed with an opening 97 as in the case of FIG. 29.

FIGS. 32 and 33 show a modification in which a transfer chuck 105 is added to the arrangement shown in FIG. 31, and the head member 106 is formed with a groove 107, in which a magnet 108 is fitted. The transfer chuck 105 is adapted to be advanced and retracted by the piston rod 109 of an air cylinder (not shown).

FIG. 34 shows a modification including a support plate 110 employed when the bolt 51 is long, the support plate having a support element 111 pivotally connected thereto through a pivot shaft 112. The support element ill is held in the illustrated position by a coil spring (not shown) wound around the pivot shaft 112. This modification is suitable when the support element 111 is positioned on the lower side.

FIG. 35 shows a modification suitable for a hexagon nut 114 having a flange 113. The inner shaft 57 is formed with a recess 115 for receiving the nut 114.

FIG. 36 shows a modification including a chucking mechanism 116 mounted on the holding portion 68. A pair of plate springs 117 and 118 are provided for clamping the bolt head 52 therebetween.

The feed rod 55 in the present invention may be disposed vertically, horizontally or obliquely, as desired.

According to the invention, the part is held by the outer shaft and transferred to an intended location, where the screw tightening is effected by the inner shaft. Thus, the holding and transferring and the screw tightening are shared by the two kinds of shaft members and hence the individual operations are smoothly and reliably performed. The two shafts, one of which is disposed inside and the other outside, can be accurately positioned in coaxial relation to each other. Therefore, the part held by the outer shaft is accurately centered also with respect to the inner shaft, and the conventional problems associated with accuracy can be easily solved. Particularly, since the part is field at the front end of the outer shaft, the feeding of threaded parts to a narrow place is easily effected, a fact which is very useful in the field of automation.

Since the holding portion for threaded parts is provided at the front end of the outer shaft, a part, even if a hemispherical bolt head, can be held without deviation. Since magnetic force or a chucking mechanism can be applied to this holding portion, the best holding suited to the shape and features of the threaded part can be chosen.

The engaging portion at the front end of the inner shaft can be made in the form of the tip of a screwdriver or the box of a box wrench. Thus, the accurate centering of the threaded part held by the outer shaft, and the paint can be received in the inner shaft without requiring any extra space.

Figure 37:
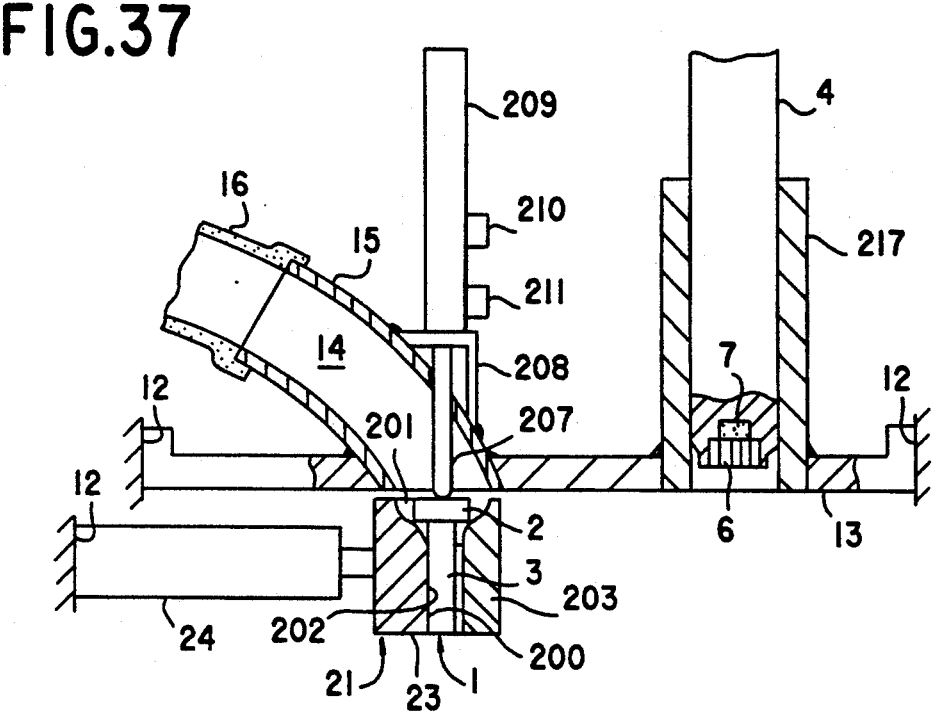
FIG. 37 is a vertical sectional lateral view of the part-holding device available for embodying a fourth embodiment of the invention.
Figure 38:
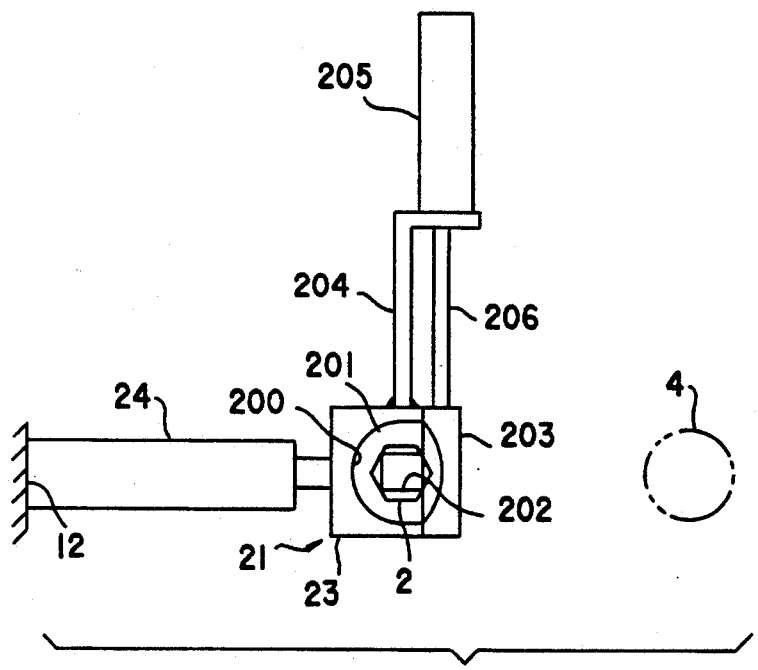
FIG. 38 is a plan of part of the part-holding device shown in FIG. 36.

Referring now to FIGS. 37 and 38, the structural details of the part-supply system according to another embodiment of the invention will be described below. FIGS. 37 and 38 respectively illustrate a case in which a rotary box wrench 4 holds a bolt 1 which comprises a shaft member 3 and a head member 2. An engaging hole 6 is provided through the tip of the rotary box wrench 4 in order to accommodate the head member 2 therein. The engaging hole 6 is either hexagonal or dodecagonal or octadecimal in shape in order that it can smoothly accommodate the hexagonal head member 2 shown in FIG. 38. A permanent magnet 7 is disposed within the engaging hole 6, where the magnet 7 absorbs and retains the bolt 1 inserted in the engaging hole 6. Structurally, the rotary box wrench 4 corresponds to and serves as a part-supply rod. The rotary box wrench 4 is stored in a guide cylinder 217 in the rotatable state and capable of slidably moving itself back and forth. Furthermore, the rotary box wrench 4 is driven by means of a motor and receives forward and backward strokes from a pneumatic cylinder. Either an electrically driven motor or a pneumatically driven motor is made available. The guide cylinder 217 is secured to a stationary member 12.

As shown in FIGS. 37 and 38, a part-holding device 21 is provided, which is structurally cuboidal in appearance. In order to accommodate a bolt 1, a recess 200 is provided with a broadwidth domain 201 and a narrow-width domain 202 which are smoothly continuous from each other. The broadwidth domain 201 accommodates the head member 2, whereas the narrow-width domain 202 accommodates the shaft member 3. In order to open and close the recess 200 which is open to one side, a blocking member 203 is provided. The blocking member 203 made of a sheet-like member operates itself by way of moving forward and backward. An L-shaped bracket 204 is connected to the part-holding member 23 via a welding process. The L-shaped bracket 204 is connected to a piston rod 206 of a pneumatic cylinder 205 which is secured to-the bracket 204. The part-holding device 21 is capable of moving itself back and forth by means of another pneumatic cylinder 24 which substantially makes up a shifting means.

Structurally, a part-supply path 14 is formed by means of a part-supply tube 15 which is connected to a bonding plate 13 via a welding process. An end of the part-supply tube 15 opens right above the recess 200. A part-supply-hose 16 made from synthetic resin is connected to the part supply tube 15 by way of being extended from a part-feeder (not shown).

The reference numeral 207 shown in FIG. 37 designates a detecting member, which is-provided for the system in order to check and confirm whether the above-identified bolt 1 is provisionally held in the recess 200 or actually present in the normal position inside of the recess 200, or not. The embodiment of the invention permits introduction of a variety of members. To implement the present invention, typically, a slender bar is introduced to serve as the detecting member 207. An L-shaped bracket 208 is connected to the part-supply tube 15 via a welding process. A pneumatic cylinder 209 is secured to the L-shaped bracket 208 where the piston rod of the pneumatic cylinder 209 is properly installed in order that the detecting member 207 can coaxially be aligned with the bolt 1. A pair of adjoining switches 210 and 211 are secured to the external circumferential surface of the pneumatic cylinder 209 in order to check and confirm the presence or absence of the bolt 1 after detecting the position of the piston rod of the pneumatic cylinder 209. For example, as shown in FIG. 37, if the bolt 1 were at the correct position inside of the recess 200, then the tip of the detecting member 207 hits against the top surface of the head member 2. In response, the above-identified switch 210 detects that the bolt 1 is correctly positioned and then outputs a position-detect signal to permit the part-supply system to proceed to the following process. Conversely, for any reason, if the bolt 1 has not yet arrived at the recess 200, then the detecting member 207 fully strokes itself to cause the other switch 211 to detect that the bolt 1 is at an abnormal position. In response to the abnormal-position detect signal, the part-supply system suspends to execute further operation.

Note that, including the second embodiment described later on, illustration of those pneumatic hoses connected to corresponding pneumatic cylinders and those cables distributed to the above-identified switches 210 and 211 is deleted. Also note that operating sequence for activating operation of the part-supply system related to the invention can easily be implemented by applying conventional electric control circuitry and motor-driven pneumatic control valves. It is suggested that, in order to intensify absorption of the above-identified magnet 7, the rotary box wrench 4 and the guide cylinder 217 be made of stainless steel which is substantially non-magnetic.

Next, functional operation of the part-supply system embodied by the invention is described below in reference to FIG. 37. As mentioned earlier, after hitting against the head member 2 at the position where the bolt 1 is provisionally held under normal state, the detecting member 207 retreats itself. Next, the part-holding device 21 is shifted to the right by operating the pneumatic cylinder 24. As a result, the bolt 1 halts itself at the position exactly coaxial with the rotary box wrench 4. Next, while maintaining the rotating movement, the rotary box wrench 4 moves forward to cause the head member 2 to be inserted in the engaging hole 6. Simultaneously, the pneumatic cylinder 205 is activated to open the blocking member 203. Following this process, the part-holding device 21 retreats itself to the left, and as a result, only the bolt 1 remains at the tip of the rotary box wrench 4. Next, the rotary box wrench 4 again moves forward while rotating itself before screwing the bolt 1 in the objective hole to complete the whole serial processes.

Figure 39:
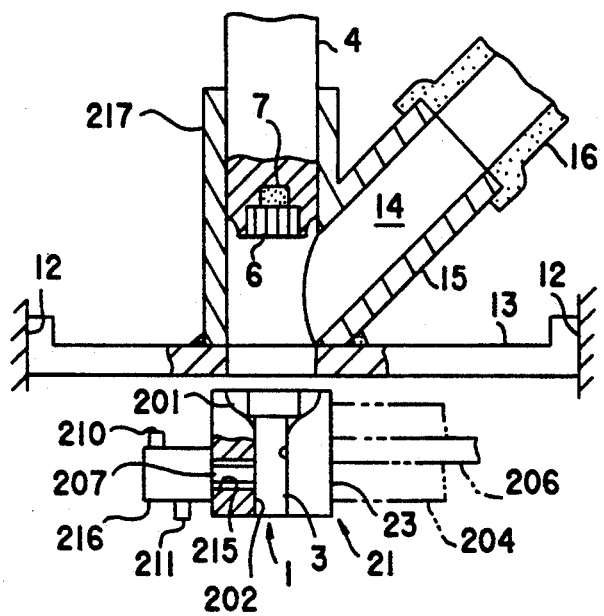
FIG. 39 is a vertical sectional view of the part-holding device according to a fifth embodiment of the invention.
Figure 40:
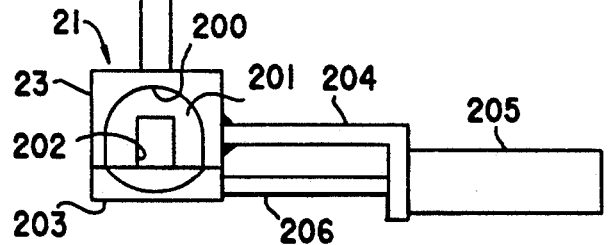
FIG. 40 is a plan of part of the part-holding device shown in FIG. 39.

FIGS. 39 and 40 respectively illustrate another embodiment in which the part-holding device 21 stands by itself at the position exactly coaxial with the rotary box wrench 4. The following description merely refers to the difference from the preceding embodiment of the invention by designating identical functional members with identical reference numerals, thus deleting detailed description of these. In this second embodiment of the invention, the part-supply path 14 interlinks with the interior of the guide cylinder 4, and yet, as shown in FIG. 39, a part-supply tube 15 is obliquely connected from the upper side. A through-hole 215 is provided through the part-holding member 23. The detecting member 207 inserted in the through-hole-28 is pressed against the shaft member 3. Structurally, the piston rod of the pneumatic cylinder 216 secured to the part-holding member 23 makes up the detecting member 207. A pair of adjoining switches 210 and 211 respectively exerting specific functions identical to those which are performed by those switches 210 and 211 provided for the preceding embodiment are installed to the pneumatic cylinder 216.

When the supplied part is correctly inserted in the recess 200, the detecting member 207 remains in contact with the shaft member 3, and thus, the detecting member 207 outputs a part-presence identifying signal. Conversely, for any reason, if the bolt 1 were not present in the recess 200, then, the detecting member 207 proceeds itself furthermore. In response, the above-identified switch 211 detects this movement and then outputs a part-absence identifying signal. In order to secure space enough to permit the rotary box wrench 4 to move forward, the part-holding device 21 is shifted in the backward direction as was done for the preceding embodiment.

Figure 41:
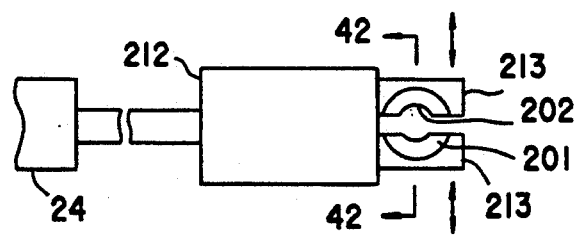
FIG. 41 is a plan of a modified part-holding device taken for example.
Figure 42:
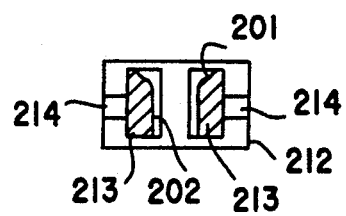
FIG. 42 is a sectional view of the modified part-holding device shown in FIG. 41 across line 42 through 42.

FIGS. 41 and 42 respectively illustrate an example of a variation of the part-holding device embodied by the invention. The part-holding device based on this variation opens and closes a pair of sandwiching members 213 and 213 respectively projecting from a main body 212 in the arrowed directions. As is clear from FIG. 42, broad-width domain 201 and narrow-width domain 202 are formed in the sandwiching members 213 and 213. These sandwiching members 213 and 213 respectively open and close themselves along grooves 214 and 214. The main body 212 incorporates a mechanism for opening and closing those sandwiching members 213 and 213. This mechanism can be materialized by providing either a rack-and-pinion system or such a system for converting cam displacement into the opening and closing movement of those sandwiching members 213 and 213.

The above embodiments respectively cause the part-holding device 21 to linearly move itself back and forth. However, the art embodied by the invention also includes conversion of the linear movement of the part-holding device 21 into circular-arc movement as another aspect of the embodiment. To implement this, the rotary box wrench 4 is disposed on the circular-arc locus of the part-holding device 21.

According to the invention, the detecting member provided for the part-supply system related to the invention checks and confirms whether the supplied part is present in the part-holding device, or not. Therefore, if no part were present in this device or the supplied part were incorrectly held in the holding position, then the detecting system instantaneously outputs a signal to designate the abnormal state of the supplied part in the part-holding device. This in turn permits the control unit to determine whether the part supply system should follow up part-supply operation, or not. Therefore, the part-feeding system can quickly and properly deal with such contingent case in which the supplied part is abnormally held in the part-holding mechanism.

Referring again to FIGS. 37 and 38, the structural detail of the part-supply system according to another embodiment of the invention will be described below. FIGS. 37 and 38 respectively illustrate a case in which a rotary box wrench 4 holds a bolt 1 which comprises a shaft member 3 and a head member 2. An engaging hole 6 is provided through the tip of the rotary box wrench 4 in order to accommodate the head member 2 therein. The engaging hole 6 is either hexagonal or dodecagonal or octadecimal in shape in order that it can smoothly accommodate the hexagonal head member 2 shown in FIG. 38. A permanent magnet 7 is disposed in the bosom of the engaging hole 6, where the magnet 7 absorbs and retains the bolt 1 inserted in the engaging hole 6. Structurally, the rotary box wrench 4 corresponds to and serves as a part-supply rod. The rotary box wrench 4 is stored in a guide cylinder 217 in the rotatable state and capable of slidably moving itself back and forth. Furthermore, the rotary box wrench 4 is driven by means of a motor and receives forward and backward strokes from a pneumatic cylinder. Either an electrically driven motor or a pneumatically driven motor is made available. The guide cylinder 217 is secured to a stationary member 12.

As shown in FIGS. 37 and 38, a part-holding device 21 is provided, which is structurally cuboidal in appearance. In order to accommodate a bolt 1, a recess 200 is provided in a part-holding member 23. The recess 200 is provided with a broad-width domain 201 and a narrow-width domain 202 which are smoothly continuous from each other. The broad-width domain 201 accommodates the head member 2, whereas the narrow-width domain 202 accommodates the shaft member 3. In order to open and close the recess 200 which is open to one side, a blocking member 203 is provided. The blocking member 203 made of a sheetlike member operates itself by way of moving forward and backward. An L-shaped bracket 204 is connected to the part-holding member 23 via a welding process. The L-shaped bracket 204 is connected to a piston rod 206 of a pneumatic cylinder 205 which is secured to the bracket 204. The part-holding device 21 is capable of moving itself back and forth by means of another pneumatic cylinder 24 which substantially makes up a shifting means.

Structurally, a part-supply path 14 is formed by means of a part-supply tube 15 which is connected to a bonding plate 13 via a welding process. An end of the part-supply tube 15 opens right above the recess 200. A part-supply hose 16 made from synthetic resin is connected to the part-supply tube 15 by way of being extended from a part-feeder (not shown).

The reference numeral 207 shown in FIG. 37 designates a detecting member, which is provided for the system in order to check and confirm whether the above-identified bolt 1 is provisionally held in the recess 200 or actually present in the normal position inside of the recess 200, or not. The embodiment of the invention permits introduction of a variety of members. To implement the present invention, typically, a slender bar is introduced to serve as the detecting member 207. An L-shaped bracket 208 is connected to the part-supply tube 15 via a welding process. A pneumatic cylinder 209 is secured to the L-shaped bracket 208, where the piston rod of the pneumatic cylinder 209 serves as the detecting member 207. The pneumatic cylinder 209 is properly installed in order that the detecting member 207 can coaxially be aligned with the bolt 1. A pair of adjoining switches 210 and 211 are secured to the external circumferential surface of the pneumatic cylinder 209 in order to check and confirm the presence or absence of the bolt 1 after detecting the position of the piston rod of the pneumatic cylinder 209. For example, as shown in FIG. 37, if the bolt 1 were at the correct position inside of the recess 200, then the tip of the detecting member 207 hits against the top surface of the head member 2. In response, the above-identified switch 210 detects that the bolt 1 is correctly positioned and then outputs a position-detect signal to permit the part-supply system to proceed to the following process. Conversely, for any reason, if the bolt 1 has not yet arrived at the recess 200, then the detecting member 207 fully strokes itself to cause the other switch 211 to detect that the bolt 1 is at an abnormal position. In response to the abnormal-position detect signal, the part-supply system suspends to execute further operation.

Note that including the second embodiment described later on, illustrations of those pneumatic hoses connected to corresponding pneumatic cylinders and those cables distributed to the above-identified switches 210 and 211 are deleted. Also note that operating sequence for activating operation of the part-supply system related to the invention can easily be implemented by applying conventional electric control circuits and motor-driven pneumatic control valves. It is suggested that, in order to intensify absorption of the above-identified magnet 7, rotary box wrench 4 and the guide cylinder 217 be made of stainless steel which is substantially non-magnetic.

Structurally, such a domain very close to the aperture of the above-identified part-supply path 14 corresponds to the part-receiving position. As shown in FIG. 37, the above-identified part-holding device 21 stands by itself right below the aperture of the part-supply path 14.

Next, the operating sequence needed for embodying the invention is described below. Concretely, FIG. 37 illustrates the state before activating functional operation of the part supply system related to the invention. The bolt 1 is supplied while the above-identified blocking member 203 remains being closed and the detecting member 207 is at the retreated position, and then the bolt 1 is inserted in the recess 200.

Next, the detecting member 207 moves to the bolt-inserted position, and then detects that the bolt 1 is correctly held. Simultaneous with the retreat of the detecting member 207, the above-identified pneumatic cylinder 24 is operated in order to shift the part-holding device 21 in the direction of the rotary box wrench 4 and then halts the movement of the part-holding device 21 at the position where the bolt 1 is exactly coaxial with the rotary box wrench 4. Next, the rotary box wrench 4 proceeds itself by an amount corresponding to a predetermined negligible stroke to cause the head member 2 of the bolt 1 to be inserted in the engaging hole 6. As a result, the head member 2 is held at the tip of the rotary box wrench 4 under support of absorption of the magnet 7. Then, the pneumatic cylinder 205 moves the blocking member 203 backward to open the recess 200. This in turn permits the part-holding device 21 to return to the part-receiving position before causing the blocking member 203 to again close the recess 200. Simultaneous with the return of the part-holding device 21 to the part-receiving position, the guide rod 4 rotates and proceeds itself while being engaged with the bolt 1. At the same time, in parallel with the operation of the guide rod 4 mentioned above, the part-holding device 21 receives the following part. In other words, the rotary box wrench 4 moves forward in synchronization with the retention of the supplied part at the part receiving position.

The invention also provides another operating sequence, in which the part-holding device 21 initially holds the following part at the part-receiving position, and then the rotary box wrench 4 moves forward to execute a part-supply operation. Immediately after the return of the rotary box wrench 4 to the part-receiving position, the part-holding device 21 transfers the following nut 3. These operating sequences based on the above-cited two aspects can easily be materialized by properly combining those control methods described above.

The above embodiment of the invention causes the part-holding device 21 to linearly move back and forth. On the other hand, another embodiment of the invention shown in FIGS. 43 and 44 causes the part-holding device to reciprocate itself on a circular-arc locus. Those component members exerting functional operations identical to those which are executed for the foregoing embodiment are respectively designated by identical reference numerals, and thus detailed description of these is deleted. In order to rotate the part-holding member 23, the second embodiment of the invention shown in FIGS. 43 and 44 provides a lengthy part-holding member. A motor 230 is secured to a stationary member 12. Rotary shaft 229 of the motor 230 is coupled with part-holding member 23. Any conventional electric or pneumatic motor may optionally be available for the motor 230. The position for installation of the rotary box wrench 4 is predetermined on the circular arc locus of the recess 200 to permit the rotary box wrench 4 to stand by itself thereon.

The invention permits the system to install a checking means between the part-receiving position and the part-supply rod in order to check and confirm whether the supplied part is correctly held or not. Concretely, this checking means checks the presence or absence of a part by irradiating light beam from the bottom side of the part-holding device.

According to the foregoing embodiment of the invention, the part-holding device is linearly shifted. On the other hand, the second embodiment shown in FIGS. 43 and 44 causes a lengthy part-holding device to rotate itself by way of pivoting on a rotary shaft 229. Except for this difference, the system of the second embodiment executes those functional operations identical to those which are performed by the foregoing embodiment, and therefore, detailed description is deleted.

FIGS. 41 and 42 respectively illustrate an example of a variation of the part-holding device embodied by the invention. The part-holding device based on this variation opens and closes a pair of sandwiching members 213 and 213 respectively projecting from a main body 212 in the arrowed directions. As is clear from FIG. 41, broad-width domain 201 and narrow-width domain 202 are formed in the sandwiching members 213 and 213. These sandwiching members 213 and 213 respectively open and close themselves along grooves 214 and 214. The main body 212 incorporates a mechanism for opening and closing those sandwiching members 213 and 213. This mechanism can be materialized by providing either a rack-and-pinion system or such a system for converting cam displacement into the opening and closing movement of those sandwiching members 213 and 213.

According to the invention, a novel part-holding system is provided, which shifts itself from a predetermined part-receiving position in the direction of a part-supply rod. Characteristically, the part-holding device receives a part at the part-receiving position while the advanced part-supply rod supplies another part. Therefore, unlike any conventional part-supply system which serially supplies parts as, described earlier, the part-holding system embodied by the invention synchronously executes two functional operations in parallel with each other. Therefore, immediately after retreating the part-supply rod, the following part already arrives at the axial line of the part-supply rod to enable the system to correctly execute part-supply operations in the shortest period of time.

If any timewise allowance were available, then the invented art causes the part-holding device to always hold the following part at the part-receiving position. After completing the part-holding process, the part-holding system activates the part-supply rod to move itself forward. As a result, immediately after retreating the part-supply rod, the following part can securely arrive at the axial line of the part-supply rod. Therefore, whenever operating the movable part-holding device, the system does not oblige the part-holding device to await the arrival of the following part at the part-receiving position, thus securely eliminating waste of time from the part-supply operation.

Figure 45:
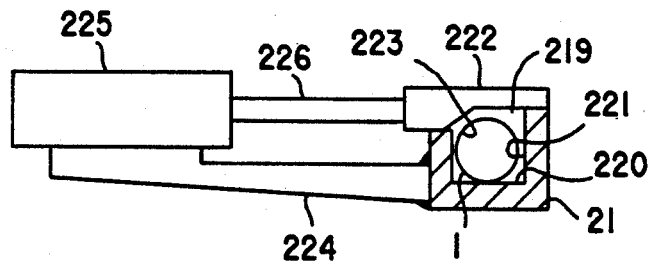
FIG. 45 a cross-sectional plan designating fundamentals of the part-holding device according to a seventh embodiment of the invention.
Figure 46:
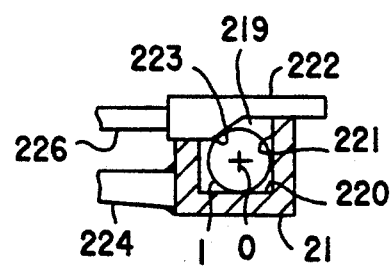
FIG. 46 is a cross-sectional plan designating operating state of the part-holding device shown in FIG. 45.

FIGS. 45 through 48 respectively illustrate cross-sectional plans each designating fundamental aspects of yet another embodiment of the invention. First, structural details shown in FIGS. 45 and 46 are described below. A part-holding member 21 having L-shaped section is provided, which is internally provided with a receptor 219 available for accommodating each shaft-like part 1 like a bolt for example. As shown in FIGS. 45 and 46, the part-holding member 21 as of rectangular-sectional grooved-recess formation. The internal wall of the part-holding member 21 makes up a bottom reference surface 220 and a side reference surface 221. Each shaft-like part 1 is of circular-sectional form and accommodated in the receptor 219. The part-holding member 21 and the shaft-like part 1 are respectively provided with a predetermined length in the vertical direction from the paper surface of illustration shown in FIG. 45 like 30 mm of length for example. A pressing member 222 is disposed by way of placing a lid on the part-holding member 21. A cam surface 223 is provided for the internal surface of the pressing member 222. A bracket 224 is connected to the part-holding member 21 via a welding process. The pressing member 222 is connected to a piston rod 226 of a pneumatic cylinder 225 which is secured to the bracket 224.

Next, the functional operation of the part-supply system shown in FIGS. 45 and 46 is described below. The structure shown in FIG. 45 designates a state in which a shaft-like part 1 shifts itself by a distance corresponding to the space inside of the receptor 219, and therefore axial position is not yet determined. Next, when operation of the pneumatic cylinder 225 is activated, the pressing member 222 moves to the right, and then the cam surface 223 diagonally hits against the upper left domain of the shaft-like part 1, and then slightly moves the shaft-like part 1 to the right while keeps on rotating it. In consequence, as shown in FIG. 46, the shaft-like part 1 is fully constrained after being brought into contact with the bottom reference surface 220, the side reference surface 221, and the cam surface 223 in three tangential directions. As a result, the axis 0 is established.

Figure 47:
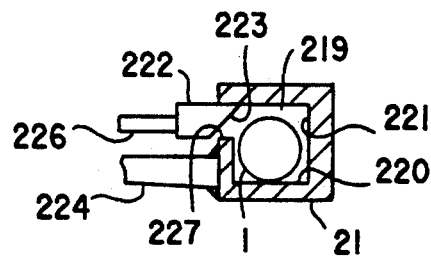
FIG. 47 is a cross-sectional plan designating fundamentals of the part holding device according to an eighth embodiment of the invention.

FIG. 47 illustrates another embodiment of the invention. The part-holding member 21 is of square shape. The pressing member 222 internally being furnished with the cam surface 223 proceeds itself inside of the receptor 219 via a through-hole 227 which is provided through a side of the part-holding member 21. The part-holding system shown in FIG. 47 executes functional operations identical to those which are described above.

Figure 48:
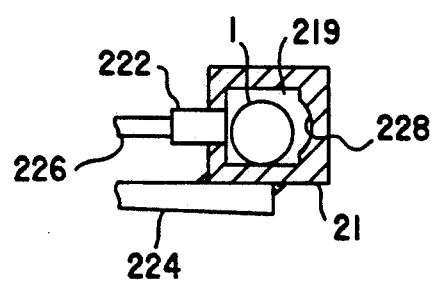
FIG. 48 is a cross-sectional plan designating fundamentals of the part-holding device according to a ninth embodiment of the invention.

FIG. 48 illustrates another embodiment of the invention. A grooved recess 228 is provided for the receptor 219. When the pressing member 222 presses the shaft-like part (bolt) 1 to the right, part of the pressed bolt 1 is inserted in the grooved recess 228 so that the axial position of the bolt 1 can be determined.

FIGS. 37 and 38 respectively illustrate such a case in which those components shown in FIGS. 45 and 46 respectively serve as the part-supply device. In this case, the shaft-like part 1 corresponds to a bolt 1 comprising a shaft member 3 and a head member 2. The part-supply system shown in FIGS. 37 and 38 drives a rotary box wrench 4 to hold the bolt 1. An engaging hole 6 is provided through the tip of the rotary box wrench 4 in order to accommodate the head member 2 of the bolt 1. Structurally, in order to correctly match the shape of the hexagonal head member 2 shown in FIG. 38, the engaging hole 6 is either hexagonal or dodecagonal or octadecimal in the shape. A permanent magnet 7 is deposited in the bosom of the engaging hole 6 to absorb and retain the bolt 1 inserted in the engaging hole 6. Structurally, the rotary box wrench 4 corresponds to the part-supply rod. The rotary box wrench 4 is accommodated in a guide cylinder 19 in such a state in which the rotary box wrench 4 can slide itself back and forth by way of rotation. The rotary box wrench 4 is driven by a motor and receives forward and backward strokes from a pneumatic cylinder. Either an electrically driven motor or a pneumatically drive motor is available for driving the rotary box wrench 4. The guide cylinder 217 is welded to a bonding plate 13 which is secured to a stationary member 12.

As shown in FIGS. 37 and 38, both referred to earlier, the part-holding device 21 is cuboidal in the structural appearance. A recess 200 is formed in the part-holding member 23 in order to accommodate an individual bolt 1 therein. The recess 200 has a broad-width domain 201 and a narrow-width domain 202 which are smoothly continuous from each other. The broad-width domain 201 accommodates the head member 2 of the supplied bolt 1, whereas the narrow width domain 202 accommodates the shaft member 3 of the same bolt 1. As shown in FIG. 38, the narrow-width domain 202 is composed of rectangular- sectional grooved recess. The recess 200 opens itself to one side. A blocking member 203 available for opening and closing the recess 200 substantially corresponds to the above-identified pressing member 222. Concretely, the blocking member 203 comprising a plate-like member moves forward and backward. An L-shaped bracket 204 is welded to the part-holding member 23. The blocking member 203 is connected to a piston rod 206 of a pneumatic cylinder 205 being secured to the L-shaped bracket 204. The part-holding device 21 is driven back and forth by means of another pneumatic cylinder 24 which substantially makes up a shifting means.

A part-supply path 14 is formed by means of a part-supply tube 15 which is connected to a bonding plate 13 via a welding process. An end of the part-supply tube 15 opens itself right above the recess 200. The domain in the periphery of the recess 200 corresponds to the part-receiving position. A part-supply hose 16 made from synthetic resin is connected to the part supply tube 15 by way of being extended from a part-feeder (not shown).

The reference numeral 207 shown in FIG. 37 designates a detecting member which is provided in order to check and conform whether the supplied bolt 1 is provisionally held in the recess 200 or actually present in the predetermined correct position in the recess 200 or not. To embody the invention, those component members of a variety of shapes may be introduced to compose the detecting member 35. In this embodiment, the detecting member 207 comprises a slender bar material. An L-shaped bracket is welded to the part-supply tube 15. A pneumatic cylinder 209 is secured to the bracket 208, where the piston rod of this cylinder 209 is made available for serving as the detecting member 207. Posture of the pneumatic cylinder 209 is properly arranged in order that the detecting member 207 can coaxially be aligned with the supplied bolt 1. A pair of adjoining switches 210 and 211 are secured to external circumferential surface of the pneumatic cylinder 209 in order to check and confirm the presence or absence of the bolt 1 in the recess 200 by detecting the position of the piston rod inside of this pneumatic cylinder 209. As shown in FIG. 37, when the bolt 1 is held at the predetermined correct position, the tip of the detecting member 207 hits against the top surface of the head member 2 of the bolt 1. In response, the above-identified switch 210 detects that the bolt 1 is at the correct position, and then outputs a signal to identify the correct position of the bolt 1 to enable the part-supply system to proceed to the following processes. Conversely, for any reason, if the bolt 1 has not yet been delivered to the recess 200, then the detecting member 207 fully strokes itself. In consequence, the other switch 211 detects that the bolt 1 is at an abnormal position, and then outputs a signal to identify the abnormally positioned bolt 1 to enable the part-supply system to suspend execution of further operation.

A cam surface 218 is formed on the internal surface of the blocking member 203. The cam surface 218 enables the part supply system to execute functional operation to correctly determine the axial position of the supplied bolt 1 in the same way as was done for the preceding embodiment described above.

Note that illustration of those pneumatic hoses connected to corresponding pneumatic cylinders and those cables distributed to the above-identified switches 210 and 211 is deleted. Also note that operating sequence for activating operation of the part-supply system related to the invention can easily be implemented by applying conventional electric control circuits and motor-driven pneumatic control valves. It is suggested that, in order to intensify absorption of the above-identified magnet 7, the rotary box wrench 4 and the guide cylinder 217 be made of stainless steel which is substantially non-magnetic.

Next, referring to FIG. 37, the functional operation of the part-supply system embodied by the invention is described below. As mentioned earlier, after hitting against the head member 2 at the position where the bolt 1 is provisionally held under normal condition, the detecting member 207 retreats itself. Next, the part-holding device 22 is shifted to the right by operating the pneumatic cylinder 24. As a result, the bolt 1 halts itself at the position exactly coaxial with the rotary box wrench 4. Next, while keeps on rotating operation, the rotary box wrench 4 moves forward to cause the head member 2 to be inserted in the engaging hole 6. Simultaneously, the pneumatic cylinder 205 is activated to open the blocking member 203. Following this process, the part supply device 21 retreats itself to the left, and as a result, only the bolt 1 remains at the tip of the rotary box wrench 4. Next, the rotary box wrench 4 again moves forward while it keeps on rotating itself before screwing the bolt 1 in the objective hole to complete the whole serial processes.

According to the invention, the supplied art is pressed against the reference surfaces and inserted in the recess of the receptor of the part-holding device. In consequence, axis of the supplied part is correctly set to the predetermined position, and therefore, deviation of the axis caused by presence of clearance can securely be prevented from occurrence, thus fully solving those technical problems cited earlier in the description of the prior art.

What is claimed is:

1. A method of feeding and tightening threaded parts to and within a workpiece, comprising the steps of:
   feeding a threaded part through a part feeding passage to an end of the passage;
   holding the threaded part with a threaded-part holding member that is adapted to be advanced and retracted;
   linearly advancing a detecting member into the holding member to detect and thereby verify a presence of a threaded part;
   retracting the detecting member from the holding member;
   moving the threaded-part holding member to a position where the threaded part is placed coaxial with a rotary feed rod;
   rotatingly and linearly advancing the feed rod and engaging the threaded part with an engaging head of the feed rod, while substantially at the same time retracting the threaded-part holding member;
   rotatingly and linearly advancing the feed rod toward a workpiece with the threaded part engaged; and
   tightening the threaded part within the workpiece.

2. A method of feeding and tightening threaded parts according to claim 1, wherein said step of advancing a detecting member into the holding member so as to detect and thereby verify a presence of the threaded part includes the step of advancing a pushing member connected to the detecting member so as to push an improperly-placed threaded part into a predetermined position axis in the holding member.

3. A method of feeding and tightening threaded parts according to claim 1, wherein said step of advancing a detecting member into the holding member so as to detect and thereby verify a presence of the threaded part includes the steps of
   attempting to advance the detecting member a predetermined distance into said holding member, and
   determining whether the detecting member advances the predetermined distance, wherein the detecting member being prevented from advancing the predetermined distance indicated the presence of the threaded part, while the detecting member advancing the predetermined distance indicates absence of the threaded part.

4. An apparatus for feeding and tightening threaded parts to and within a workpiece, comprising:
   a threaded-part holding member operatively positioned to advance and retract along an advance and retraction axis, said holding member being formed for receiving a threaded part therein and for holding the threaded part along a predetermined position axis;
   a part feeding tube whose end opens on or adjacent the advance and retraction axis of said holding member;
   an advancing and retracting detection member positionally aligned with said holding member to linearly advance into and retract out of said holding member, said detection member being positioned for detecting and verifying a presence of the threaded part in said holding member when said detection member is advanced; and
   a rotary feed rod having an engaging head, said rotary feed rod positioned to rotatingly and linearly advance and retract orthogonal to the advance and retraction axis of said holding member, and coaxially align with the position axis of the threaded part when said holding member is operatively aligned with said rotary feed rod to allow the engaging head to engage the threaded part.

5. An apparatus for feeding and tightening threaded parts according to claim 4, wherein said detection member includes pushing means for pushing an improperly placed threaded part into alignment with the position axis in said holding member such that said detection member can advance along the position axis to detect the threaded part.

6. An apparatus for feeding and tightening threaded parts according to claim 4, wherein said detection member is formed to advance at maximum a predetermined distance along the position axis wherein said detection member advancing the predetermined distance indicates an absence of the threaded part and said detection member not advancing the predetermined distance indicates the presence of the threaded part.

7. An apparatus for feeding and tightening threaded parts to and within a workpiece, comprising:
   a threaded-part transfer member operatively positioned to advance and retract along an advance and retraction axis;
   a part feeding tube having an end which opens on or adjacent the advance and retraction axis of said transfer member;
   a rotary feed rod having an engaging head, said rotary feed rod positioned to rotatingly and linearly advance and retract orthogonal to the advance and retraction axis of said transfer member;
   part holding means attached to a front end of said transfer member, for holding a threaded part provided from said part feeding tube in a position coaxial to a rotary axis of said rotary feed rod and in a predetermined position axis; and
   an advancing and retracting detection member positionally aligned with said transfer member to linearly advance into and retract out of said part holding means, said detection member being positioned to detect and verify a presence of the threaded part held in said part holding means when said detection member is advanced.

8. An apparatus for feeding and tightening threaded parts according to claim 7, wherein said detection member includes pushing means for pushing an improperly placed threaded part into alignment with the position axis in said holding means such that said detection member can advance along the position axis to detect the threaded part.

9. An apparatus for feeding and tightening threaded parts according to claim 7, wherein said detection member is formed to advance at maximum a predetermined distance along the position axis wherein said detection member advancing the predetermined distance indicates an absence of the threaded part and said detection member not advancing the predetermined distance indicates the presence of the threaded part.

10. An apparatus for feeding and tightening threaded parts according to claim 7, wherein said holding means includes
   a part holding device having defined therein a recess formed to receive the threaded part, the recess being formed with an upper broad portion for receiving a head portion of the threaded part and with a lower narrow portion for receiving a shaft portion of the threaded part, and a blocking member positioned so as to be removably aligned with the part holding device when said holding means is in position to receive the threaded part and to be separated from the part holding device when said holding means is in position to have said feed rod engage the threaded part.

11. An apparatus for feeding and tightening threaded parts according to claim 10, wherein said advancing and retracting detection member is operatively connected to said part holding means to advance into and retract out of the part holding device through a through-hole defined therein orthogonal to a position axis of the threaded part in the part holding device, said detecting member being further formed to holdingly abut against the threaded part when advanced to facilitate said rotary feed rod engaging the threaded part.

12. An apparatus for feeding and tightening threaded parts according to claim 7, wherein said holding means includes
a part holding device having two opposingly positioned sandwiching members, the sandwiching members together defining therebetween a recess formed to receive the threaded part, the recess being formed with an upper broad portion for receiving a head portion of the threaded part and with a lower narrow portion for receiving a shaft portion of the threaded part, and the sandwiching members being operatively connected to the part holding device so as to be alignably closed with each other when said holding means is in position to receive the threaded part and to be separated from each other when said holding means is in position to have said feed rod engage the threaded part.

13. An apparatus for feeding and tightening threaded parts according to claim 7, wherein said holding means includes
a part holding device having defined therein a receptor portion formed to receive the threaded part, the receptor portion being formed with an upper chamber portion for receiving a head portion of the threaded part and with a lower cylinder portion for receiving a shaft portion of the threaded part,
a pressing lid operatively positioned with the upper chamber portion of the part holding device to alignably fit over an upper receiving aperture of the upper chamber portion, and
lid pushing means operatively connected to the lid, for pushing the lid to alignably fit with the receiving aperture wherein pushing the lid pushes a received threaded part into position in the part holding device.

14. An apparatus for feeding and tightening threaded parts according to claim 13, wherein the pressing lid incorporates a cam surface to contact with the received threaded part to push the received threaded part into position in the part holding device.

15. An apparatus for feeding and tightening threaded parts according to claim 7, wherein said holding means includes
a part holding device having defined therein a receptor portion formed to receive the threaded part, the receptor portion being formed with an upper chamber portion for receiving a head portion of the threaded part and with a lower cylinder portion for receiving a shaft portion of the threaded part,
a pressing surface operatively positioned with the upper chamber portion of the part holding device to alignably fit with a side aperture portion of the upper chamber portion, and
pushing means operatively connected to the pressing surface, for pushing the pressing surface to alignably fit with the side aperture portion wherein pushing the pressing surface pushes a received threaded part into position in the part holding device.

16. An apparatus for feeding and tightening threaded parts according to claim 7, wherein said advancing and retracting detection member is operatively connected to said part holding means to advance into and retract out of said part holding means through a through-hole defined therein orthogonal to a position axis of the threaded part in said part holding means, said detecting member being further formed to holdingly abut against the threaded part when advanced to facilitate said rotary feed rod engaging the threaded part.

17. A method of feeding and tightening threaded parts to and within a workpiece, comprising the steps of:
feeding a threaded part through a part feeding passage to an end of the passage;
holding the threaded part on a threaded-part holding member that is adapted to be advanced and retracted, the holding member holding the threaded part at or adjacent the end of the part feeding passage;
linearly advancing a detecting member into the holding member to detect and thereby verify a presence of the threaded part;
retracting the detecting member from the holding member;
linearly moving the threaded-part holding member to a position wherein the threaded part is coaxial with a rotary feed rod;
rotatingly and linearly advancing the feed rod so as to engage the threaded part with an engaging head of the feed rod, while substantially at the same time retracting the holding member;
rotatingly and linearly advancing the feed rod toward a workpiece with the threaded part engaged; and
tightening the threaded part within the workpiece.

18. A method of feeding and tightening threaded parts according to claim 17, wherein said step of advancing a detecting member into the holding member so as to detect and thereby verify a presence of the threaded part includes the step of advancing a pushing member connected to the detecting member so as to push an improperly-placed threaded part into a predetermined position axis in the holding member.

19. A method of feeding and tightening threaded parts according to claim 17, wherein said step of advancing a detecting member into the holding member so as to detect and thereby verify a presence of the threaded part includes the steps of
attempting to advance the detecting member a predetermined distance into said holding member, and
determining whether the detecting member advances the predetermined distance, wherein the detecting member being prevented from advancing the predetermined distance indicates the presence of the threaded part, while the detecting member advancing the predetermined distance indicates absence of the threaded part.

20. An apparatus for feeding and tightening threaded parts to and within a workpiece, comprising:
a threaded-part holding member operatively positioned to advance and retract along an advance and retraction axis, and further positioned so as to be in a standby position adjacent an end of a part feeding tube, said holding member being formed so as to hold a threaded part in a predetermined position axis;

an advancing and retracting detection member positionally aligned with said holding member to linearly advance into and retract out of said holding member, said detection member being positioned to detect and verify a presence of the threaded part in said holding member when said detection member is advanced; and a rotary feed rod having an engaging head, said rotary feed rod positioned to rotatingly and linearly advance and retract orthogonal to the advance and retraction axis of said holding member.

21. An apparatus for feeding and tightening threaded parts according to claim 20, wherein said detection member includes pushing means for pushing an improperly placed threaded part into alignment with the position axis in said holding member such that said detection member can advance along the position axis so as to detect the threaded part.

22. An apparatus for feeding and tightening threaded parts according to claim 20, wherein said detection member is formed to advance at maximum a predetermined distance along the position axis wherein said detection member advancing the predetermined distance indicates an absence of the threaded part and said detection member not advancing the predetermined distance indicates the presence of the threaded part.

23. An apparatus for feeding and tightening threaded parts to and within a workpiece, comprising:

a threaded-part transfer member operatively positioned to advance and retract along an advance and retraction axis, and further positioned to be in a standby position adjacent an end of a part feeding tube;

a rotary feed rod having an engaging head, said rotary feed rod positioned to rotatingly and linearly advance and retract orthogonal to the advance and retraction axis of said transfer member;

part holding means attached to said transfer member, for holding a threaded part provided from said part feeding tube in a position coaxial to a rotary axis of said rotary feed rod and in a predetermined position axis; and an advancing and retracting detection member positionally aligned with said transfer member to linearly advance into and retract out of said part holding means, said detection member being positioned to detect and verify a presence of the threaded part held in said part holding means when said detection member is advanced.

24. An apparatus for feeding and tightening threaded parts according to claim 23, wherein said detection member includes pushing means for pushing an improperly placed threaded part into alignment with the position axis in said holding means such that said detection member can advance along the position axis to detect the threaded part.

25. An apparatus for feeding and tightening threaded parts according to claim 23, wherein said detection member is formed to advance at maximum a predetermined distance along the position axis wherein said detection member advancing the predetermined distance indicates an absence of the threaded part and said detection member not advancing the predetermined distance indicates the presence of the threaded part.

26. An apparatus for feeding and tightening threaded parts according to claim 23, wherein said holding means includes a part holding device having defined therein a recess formed to receive the threaded part, the recess being formed with an upper broad portion for receiving a head portion of the threaded part and with a lower narrow portion for receiving a shaft portion of the threaded part, and a blocking member positioned so as to be removably aligned with the part holding device when said holding means is in position to receive the threaded part and to be separated from the part holding device when said holding mean sis in position to have said feed rod engage the threaded part.

27. An apparatus for feeding and tightening threaded parts according to claim 26, wherein said advancing and retracting detection member is operatively connected to said part holding means to advance into and retract out of the part holding device through a through-hole defined therein orthogonal to a position axis of the threaded part in the part holding device, said detecting member being further formed to holdingly abut against the threaded part when advanced to facilitate said rotary feed rod engaging the threaded part.

28. An apparatus for feeding and tightening threaded parts according to claim 23, wherein said holding means includes a part holding device having two opposingly positioned sandwiching members, the sandwiching members together defining therebetween a recess formed to receive the threaded part, the recess being formed with an upper broad portion for receiving a head portion of the threaded part and with a lower narrow portion for receiving a shaft portion of the threaded part, and the sandwiching members being operatively connected to the part holding device so as to be alignably closed with each other when said holding means is in position to receive the threaded part and to be separated from each other when said holding means is in position to have said feed rod engage the threaded part.

29. An apparatus for feeding and tightening threaded parts according to claim 23, wherein said holding means includes a part holding device having defined therein a receptor portion formed to receive the threaded part, the receptor portion being formed with an upper chamber portion for receiving a head portion of the threaded part and with a lower cylinder portion for receiving a shaft portion of the threaded part, a pressing lid operatively positioned with the upper chamber portion of the part holding device to alignably fit over an upper receiving aperture of the upper chamber portion, and lid pushing means operatively connected to the lid, for pushing the lid to alignably fit with the receiving aperture wherein pushing the lid pushes a received threaded part into position in the part holding device.

30. An apparatus for feeding and tightening threaded parts according to claim 29, wherein the pressing lid incorporates a cam surface to contact with the received threaded part to push the received threaded part into position in the part holding device.

31. An apparatus for feeding and tightening threaded parts according to claim 23, wherein said holding means includes

- a part holding device having defined therein a receptor portion formed to receive the threaded part, the receptor portion being formed with an upper chamber portion for receiving a head portion of the threaded part and with a lower cylinder portion for receiving a shaft portion of the threaded part,
- a pressing surface operatively positioned with the upper chamber portion of the part holding device to alignably fit with a side aperture portion of the upper chamber portion, and pushing means operatively connected to the pressing surface, for pushing the pressing surface to alignably fit with the side aperture portion wherein pushing the pressing surface pushes a received threaded part into position in the part holding device.

32. An apparatus for feeding and tightening threaded parts according to claim 23, wherein said advancing and retracting detection member is operatively connected to said part holding means to advance into and retract out of said part holding means through a through-hole defined therein orthogonal to a position axis of the threaded part in said part holding means, said detecting member being further formed to holdingly abut against the threaded part when advanced to facilitate said rotary feed rod engaging the threaded part.

33. A method of feeding and tightening threaded parts to and within a workpiece, comprising the steps of:

- feeding a threaded part through a part feeding passage; holding the threaded part with a threaded part holding member;
- linearly advancing a detecting member into the holding member so as to detect and thereby verify a presence of the threaded part;
- retracting the detecting member from the holding member;
- positioning with threaded part where the threaded part is placed coaxial with a rotary feed rod;
- advancing and rotating the rotary feed rod to engage with the threaded part;
- advancing and rotating the rotary feed rod toward a workpiece with the threaded part engaged; and
- tightening the threaded part within the workpiece.

34. An apparatus of feeding and tightening threaded parts according to claim 33, wherein said step of advancing a detecting member into the holding member so as to detect and thereby verify a presence of the threaded part includes the step of advancing a pushing member connected to the detecting member so as to push an improperly-placed threaded part into a predetermined position axis in the holding member.

35. A method of feeding and tightening threaded parts according to claim 33, wherein said step of advancing a detecting member into the holding member so as to detect and thereby verify a presence of the threaded part includes the steps of

- attempting to advance the detecting member a predetermined distance into said holding member, and
- determining whether the detecting member advances the predetermined distance, wherein the detecting member being prevented from advancing the predetermined distance indicates the presence of the threaded part, while the detecting member advancing the predetermined distance indicates absence of the threaded part.

36. An apparatus for feeding and tightening threaded parts to and within a workpiece, comprising:

- a threaded-part holding member operatively positioned to advance and retract relative to a rotary feed rod, said holding member being formed to hold a threaded part in a predetermined position axis;
- a part feeding tube positioned to feed the threaded parts to said holding member;
- an advancing and retracting detection member positionally aligned with said holding member to linearly advance into and retract out of said holding member, said detection member being positioned to detect and verify a presence of the threaded part when said detection member is advanced; and
- a rotary feed rod having an engaging head which engages the threaded part held by said holding member in conjunction with advance and retract operation of said holding member.

37. An apparatus for feeding and tightening threaded parts according to claim 36, wherein said detection member includes pushing means for pushing an improperly placed threaded part into alignment with the position axis in said holding member such that said detection member can advance along the position axis to detect the threaded part.

38. An apparatus for feeding and tightening threaded parts according to claim 36, wherein said detection member is formed to advance at maximum a predetermined distance along the position axis wherein said detection member advancing the predetermined distance indicates an absence of the threaded part and said detection member not advancing the predetermined distance indicates the presence of the threaded part.

* * * * *

UNITED STATES PATENT AND TRADEMARK OFFICE
CERTIFICATE OF CORRECTION

PATENT NO.   :   5,291,645
DATED        :   March 8, 1994
INVENTOR(S)  :   Toshitaka AOYAMA It is certified that error appears in the above-identified patent and that said Letters Patent is hereby corrected as shown below:

On the Title Page, Item [30], fourth line, change "4-127685" to -- 4-127865 --.

Signed and Sealed this

Twenty-sixth Day of March, 1996

Attest:

BRUCE LEHMAN

Attesting Officer

Commissioner of Patents and Trademarks